US005592738A

United States Patent [19]

Reiersgaard et al.

[11] Patent Number: 5,592,738

[45] Date of Patent: Jan. 14, 1997

[54] SYSTEM FOR QUICKLY TERMINATING WIRES AND PREVENTING FAULTY CRIMPS

[75] Inventors: William L. Reiersgaard, Portland; Andrew W. Knebel, Jr., Fairview; Curtis A. Davis, Portland; John M. Reiersgaard, Portland; Lloyd E. Pelton, Portland, all of Oreg.

[73] Assignee: Gaard Automation Inc., Portland, Oreg.

[21] Appl. No.: 591,736

[22] Filed: Jan. 25, 1996

Related U.S. Application Data

[62] Division of Ser. No. 161,135, Dec. 2, 1993, Pat. No. 5,511,307.

[51] Int. Cl.[6] .......... B23P 19/00; H01R 43/055

[52] U.S. Cl. .......... 29/863; 29/753

[58] Field of Search .......... 29/863, 865, 866, 29/748, 750, 751, 753, 33 M

[56] References Cited

U.S. PATENT DOCUMENTS

| | | | |
|---|---|---|---|
| 3,264,860 | 8/1966 | Herb | 29/748 |
| 3,710,610 | 1/1973 | McCaughey | 29/751 |
| 4,182,030 | 1/1980 | Mullins | 29/753 |
| 4,443,936 | 4/1984 | Lazaro, Jr. | 29/748 |
| 4,835,855 | 1/1989 | Eaton et al. | 29/748 |
| 4,951,369 | 8/1990 | Verrall | 29/748 |
| 4,974,314 | 12/1990 | Nickerson et al. | 29/751 |

OTHER PUBLICATIONS

Tri–Star Electronics International, Inc. Operations Manual, pp. 2–1, 2–3, 2–4, 2–5.

Astro Tool Corp. (Catalog of products) pp. 28, 38, 39, 40, cover.

AMP, Incorporated promotional literature (7 double–sided pages).

Komax Product Literature (15 double–sided pages).

Crimp Tech Inc. promotional material on "Victory" V–92 (2 pages).

PICO Corporation promotional literature (2 double–sided pages).

*Primary Examiner*—P. W. Echols
*Attorney, Agent, or Firm*—Chernoff, Vilhauer, McClung & Stenzel

[57] ABSTRACT

A system for attaching electrical contacts to the conductive ends of wires preferably provides simultaneous sorting operations, wherein different contacts from separate batches are simultaneously sorted in consecutive order; preselection operations, wherein contacts stuck together are removed; simultaneous holding operations, wherein presorted contacts from each batch are accumulated in separate, automatically resupplied queues, for rapid subsequent retrieval by the operator; pneumatic transporting operations, wherein contacts are rapidly retrieved from any queue selected and prealigned opposite the crimping jaws of a crimping unit; and two-step crimping operations, wherein prealigned contacts are quickly gripped by partially closed crimping jaws, in the first step, in preparation for the second step of wire end insertion and full crimping. A pneumatic cylinder, which closes the crimping jaws via a cable, is forced by a ratcheting mechanism to complete its full stroke, thus keeping the cable taut compatibly with full cycle crimping jaw operation. A physical restraining mechanism prevents off-axis contact bending during crimping. Wires are inserted between the crimping jaws through a guide channel, preferably of funnel-like reverse hyperbolic shape with a prealignment cavity for receiving the base end of the contact. After insertion, the wires enter this cavity through an inner end of the channel smaller than the inner diameter of such base end, thereby funneling the wire strands completely into the base end. After crimping, the guide channel expands for subsequent removal of this base end through the channel.

10 Claims, 12 Drawing Sheets

SYSTEM FOR QUICKLY TERMINATING WIRES AND PREVENTING FAULTY CRIMPS

This application is a division of application Ser. No. 08/161,135, filed Dec. 2, 1993, now U.S. Pat. No. 5,511,307.

BACKGROUND OF THE INVENTION

This invention relates to a crimping system for attaching electrical contacts to the conductive ends of wires. In particular, this invention relates to a system of the type in which the operator need only introduce the conductive end of a wire through a wire-positioning channel in order to enable a preoriented contact to be crimped to such end either in response to an operator-initiated signal or automatically.

Automatic and semiautomatic crimping systems are available from a number of different manufacturers. These include AMP Incorporated based in Harrisburg, Pa., Astro Tool Corporation based in Beaverton, Oreg., Komax based in Chicago, Ill. and Tri-Star Electronics International, Inc. based in El Segundo, Calif. In these systems, a number of contacts are successively cycled through a feeding mechanism so that each is aligned, in turn, with a set of crimping jaws that is included on a crimping mechanism which is also a part of each system. The operator or, in some systems, a robot arm inserts the conductive end of a wire through a wire-positioning channel in order to generally align the wire end with the prepositioned contact so that when the jaws of the crimping mechanism close, the contact is deformably attached to the conductive end of the wire.

One difficulty that has been encountered in connection with conventional crimping systems is that the wires can be inserted into the wire-receiving channel and their respective ends crimped at a faster rate than it is possible to cycle contacts through the feeding mechanism, particularly if contacts are being fed into the feeding mechanism in a loose batch so that it is necessary for the feeding mechanism to sort out the contacts and orientate each contact properly. -One type of feeding mechanism that has been used to sort contacts is a vibratory bowl assembly which has an upper stage connected to a contact-feeding chute. When the bowl is agitated, loose contacts inside the bowl travel along a ramped shoulder formed inside the bowl to the upper stage and then slide down the contact-feeding chute. A crimping system having a contact-feeding mechanism of this type is manufactured, for example, by Tri-Star Electronics International, Inc.

Although the present applicants are not familiar with all of the details of operation of the system just identified, in similarly designed systems, it is possible to transfer contacts from the above-described type of vibratory bowl sorter to the contact-feeding chute at a rate of about one contact every three seconds. On the other hand, it is possible for an experienced operator to manually insert wires into the wire-positioning channel and to initiate a signal (e.g., via a foot-pedal) that causes a contact to be crimped onto each wire at a rate of about one crimped contact every one and one-half seconds. Accordingly, the experienced operator is forced to pause between crimping operations in order to give the crimping system time to complete its contact processing cycle, so that less than full utilization is made of the operator's experience and skill. In conventional systems, then, the type of operation which is used can be characterized as "same-time processing" insofar as the contacts are used by the operator for the crimping operation at almost the same time they complete their initial feeding cycle.

Another problem encountered with conventional crimping systems is the moderately high probability that a faulty crimp will occur relative to the total number of crimps that are attempted. Faulty crimps can occur, for example, when the conductive end of the wire, during its insertion, forces back the contact away from its , prealigned position relative to the jaws of the crimping mechanism. When this occurs, the jaws then close about and crimp a portion of the contact that is longitudinally offset from that portion which is designed to be crimped. This type of faulty crimp is particularly likely to occur if the conductive end of the wire is formed of very fine strands, because these fine strands, even as they are being inserted through the wire-positioning channel, have a tendency to spread apart from each other in such a manner that one or more of the strands can catch on the extreme end of the contact and thereby push the contact backward. To address this particular problem, sometimes an operator will compress the individual strands by rolling them between his or her fingers, but this technique is unsuitable for those applications in which highly reliable electrical connections are needed, such as those pertaining to military-related uses, because such rolling imparts moisture, oil and other residues to the wire end that promotes rapid corrosion of the strands and that covers the end in an oxidizing film which lowers the conductivity of the resulting crimped connection.

Even if the contact remains correctly positioned relative to the jaws of the crimping mechanism, faulty crimps can still occur if the conductive end of the wire is mispositioned relative to the contact. Such mispositioning will occur, for example, if the operator fails to fully insert the wire into the wire-positioning channel prior to initiating the signal that causes the crimping jaws to close and to crimp the contact. In some instances, the contact may completely fail to attach to the conductive end of the wire so that after the operator withdraws the wire from the wire-positioning channel, the operator is then forced to remove the lodged contact either by partially disassembling the crimping unit or by extracting the contact through the channel with a contact-extracting pick. A related but somewhat different type of crimping fault can occur when stranded wire is used, because it is possible for the outer ones of the individual strands to fold back upon themselves should they happen to encounter the sides of the wire-positioning channel at too sharp an angle of approach. If a sufficient number of the strands are reflected in this manner, this can increase the cross-sectional area of the wire end to a sufficient extent as to prevent the end from entering the contact if the contact is of a small-bore type. Moreover, irrespective of whether the contact is of small-bore, large-bore or open type, these reflected strands can form barely visible conductive pigtails which stick out from beneath the crimped contact and which can short electrically to surrounding conductors, particularly if the contact is closely arranged with similar contacts in order to provide a high-density contact array.

In accordance with the foregoing, an object of the present invention, in at least preferred embodiments thereof, is to provide a crimping system that permits loose contacts to be sorted after they have entered the system and that further permits these contacts to be used for terminating wires at a faster rate than has heretofore been possible.

Another object of the present invention, in at least preferred embodiments thereof, is to prevent the occurrence of at least certain type of faulty crimps or to otherwise increase the probability of obtaining fault-free crimps.

SUMMARY OF THE INVENTION

The present invention overcomes the foregoing drawback of the prior art by providing a crimping system in which certain operational sequences and structural components have been modified in order to achieve improved performance.

In accordance with a first aspect of the present invention, certain contacts are taken from a haphazard batch of contacts and rearranged one ahead of the other in a certain order for transfer to a holding unit, from which unit selected ones of the contacts are removed and each separately attached, by crimping, to the conductive end of a wire at a faster rate than the contacts are being rearranged and transferred to the holding unit. Preferably, in order to achieve this faster rate of processing, a quantity of contacts, representing at least a portion of those being transferred, are accumulated in the holding unit ahead of time. In accordance with this sequence of operations, the operator is not required to pause between crimping operations while waiting for the contacts to be rearranged and transported by the system to the crimping unit.

In accordance with a second aspect of the present invention, an intermediate operation is added to the crimping sequence, that is, after an electrical contact is positioned between the jaws of the crimping mechanism, these jaws are partially closed so that they firmly grip the contact without crimping it. Next, the conductive end of the wire is positioned along the contact and the crimping mechanism is fully closed in order to crimp the contact for attachment to the conductive end. This operational sequence prevents the conductive end from pushing the contact to a position of misalignment relative to the jaws before the jaws are able to crimp the contact.

In accordance with a third aspect of the present invention, a wire-positioning channel is provided having respective forward and rearward ends, in which the forward and is of larger cross-sectional area than the rearward end, and a wire is selected having a conductive end of cross-sectional area smaller than such forward end and larger than such rearward end. Furthermore, a crimping mechanism is provided and the conductive end of the wire is positioned between the jaws of this mechanism by fully inserting such end through the wire-positioning channel starting at the forward end of the channel, so that a contact, which is also positioned between the jaws, will be deformably attached to the conductive end when the crimping mechanism is closed. This procedure enables the cross-sectional area of the end of the wire to be reduced relative to its initial cross-sectional area after, and preferably as, it is inserted through the channel. Preferably also, a contact is selected for crimping that has a cylindrical-shaped end of larger inner diameter than the rearward end to ensure that the individual strands forming the conductive end are not splayed out over a cross-sectional area larger than will fit within the cylindrical-shaped end.

In accordance with a fourth aspect of the present invention, an apparatus is provided having a crimping mechanism and a wire-positioning guide, which guide forms a channel and is mounted adjacent the crimping mechanism so that the conductive end of a wire inserted through the channel is positioned between the jaws of such mechanism for crimping attachment to a contact. The channel, in accordance with this fourth aspect, is generally funnel-like in form and of a progressively narrowing, inwardly curving shape. This ensures that the strands forming the conductive end will be funneled, with increasing likelihood as the strands advance through the channel, forwardly toward the jaws without being bent backwards upon themselves. Preferably the guide has sides forming the channel and these sides are movable to expand the channel so that the conductive end of the wire, with the crimped contact attached to it, can be withdrawn back through the channel, even when the diameter of the contact is larger than the rearward end of the channel.

The foregoing and other objectives, features, and advantages of the invention will be more readily understood upon consideration of the following detailed description of the invention, taken in conjunction with the accompanying drawings.

Figure 2:
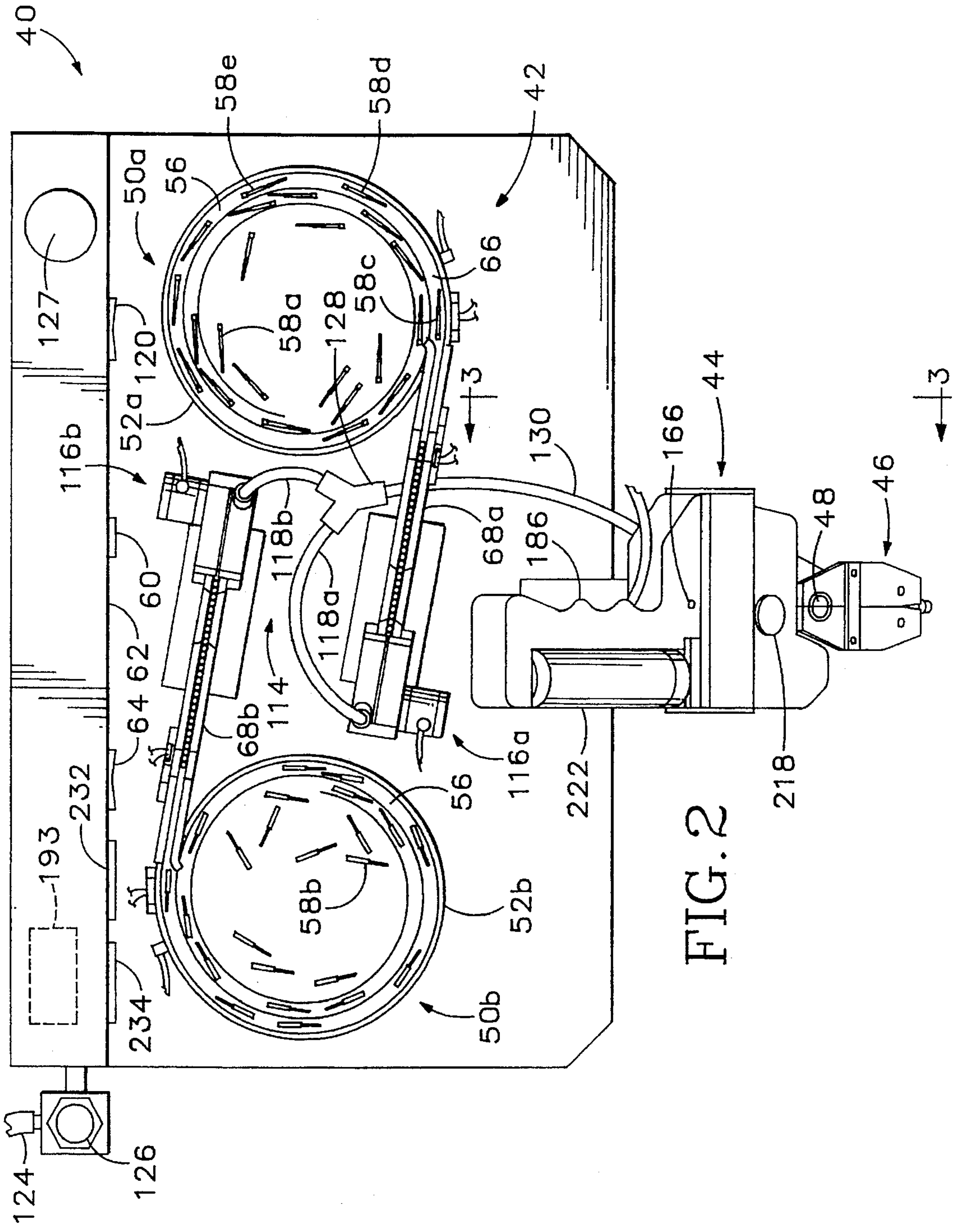
FIG. 2 is a plan view of the exemplary crimping system of FIG. 1 which shows an exemplary feeding assembly included on the system that has been loaded with loose contacts and that has presorted certain ones of the contacts in accordance with the present invention.

FIG. **4*a* is an enlarged and partially broken-away plan view of a portion of the exemplary feeding assembly shown in FIG. 2** and further depicts the contacts at a certain instant in their presorting cycle.

FIG. **4*b* is a fragmentary view of the feeding assembly of FIG. 4*a*** showing the contacts at a later instant in their presorting cycle.

Figure 5:
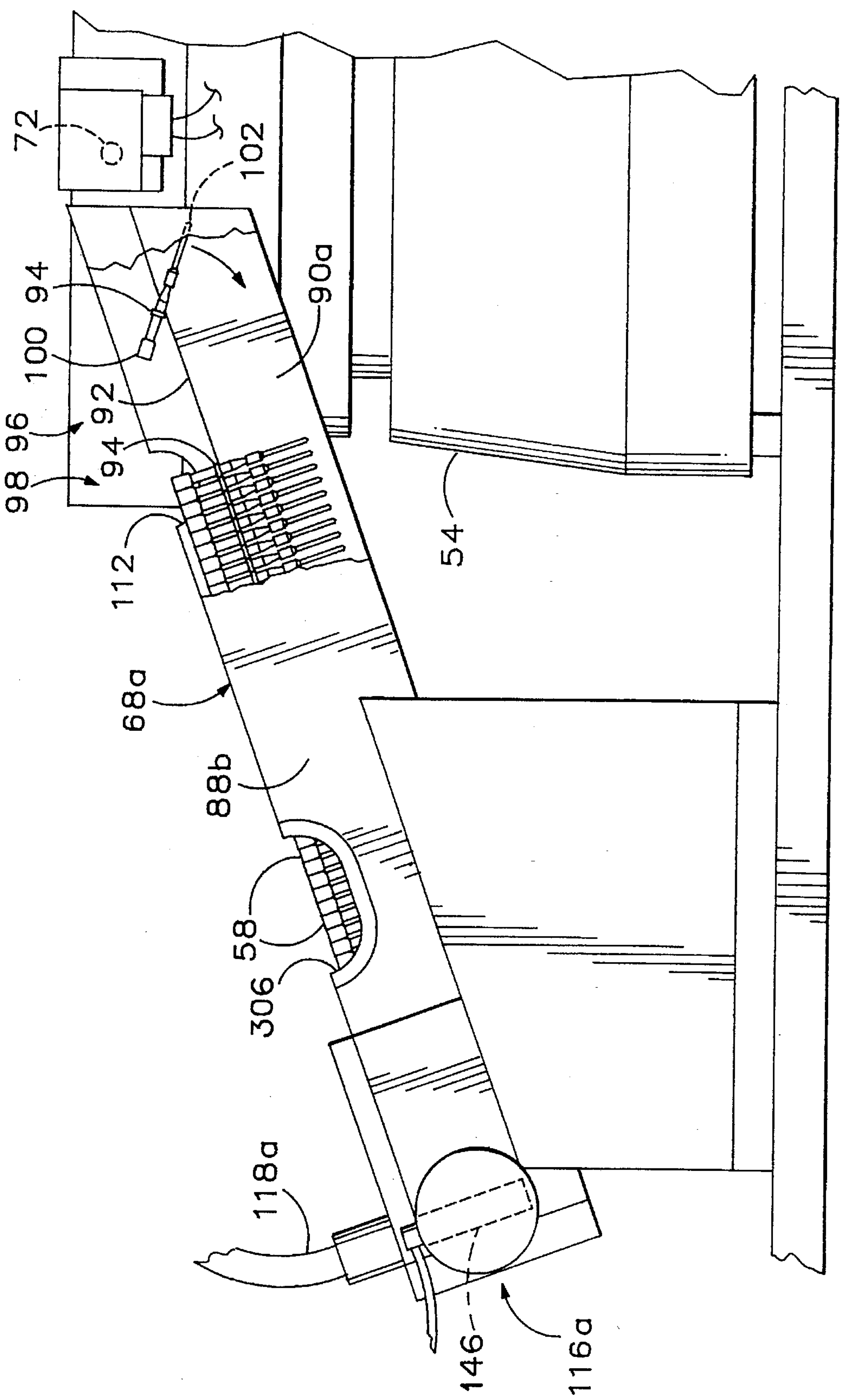

FIG. 5 is a side elevational view taken along lines 5—5 in FIG. **4*a*** in which portions of the feeding assembly have been removed to show how contacts are being oriented by the feeding assembly.

Figures 4A, 4B:
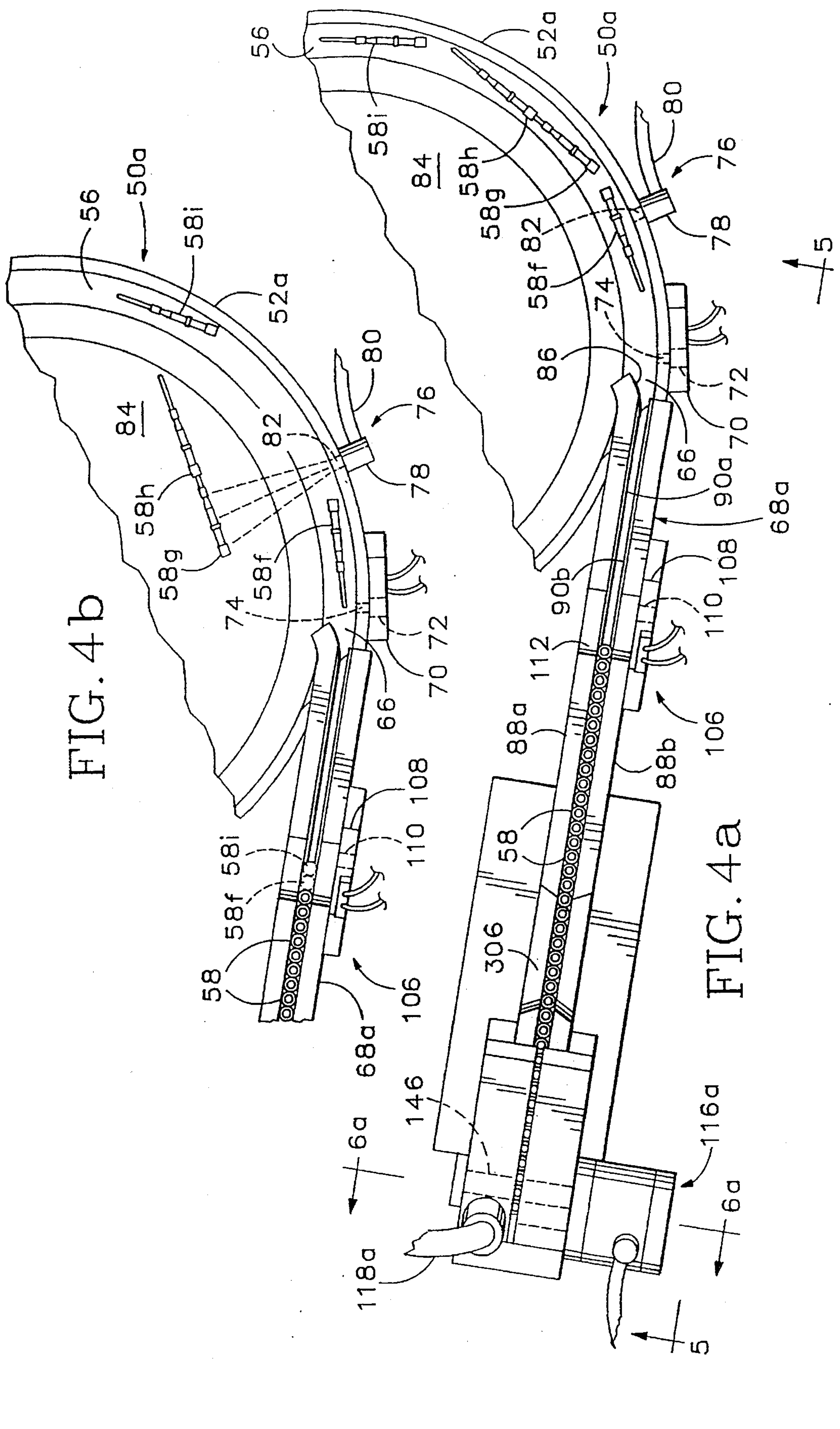

FIG. **6*a* is a sectional view taken along lines 6*a*–6*a* of FIG. 4*a*** showing a shuttle valve that is included on the exemplary feeding assembly together with a contact loaded in the shuttle valve.

FIG. **6*b* shows the shuttle valve and contact of FIG. 6*a*** at a later instant in the contact presorting cycle.

Figure 1:
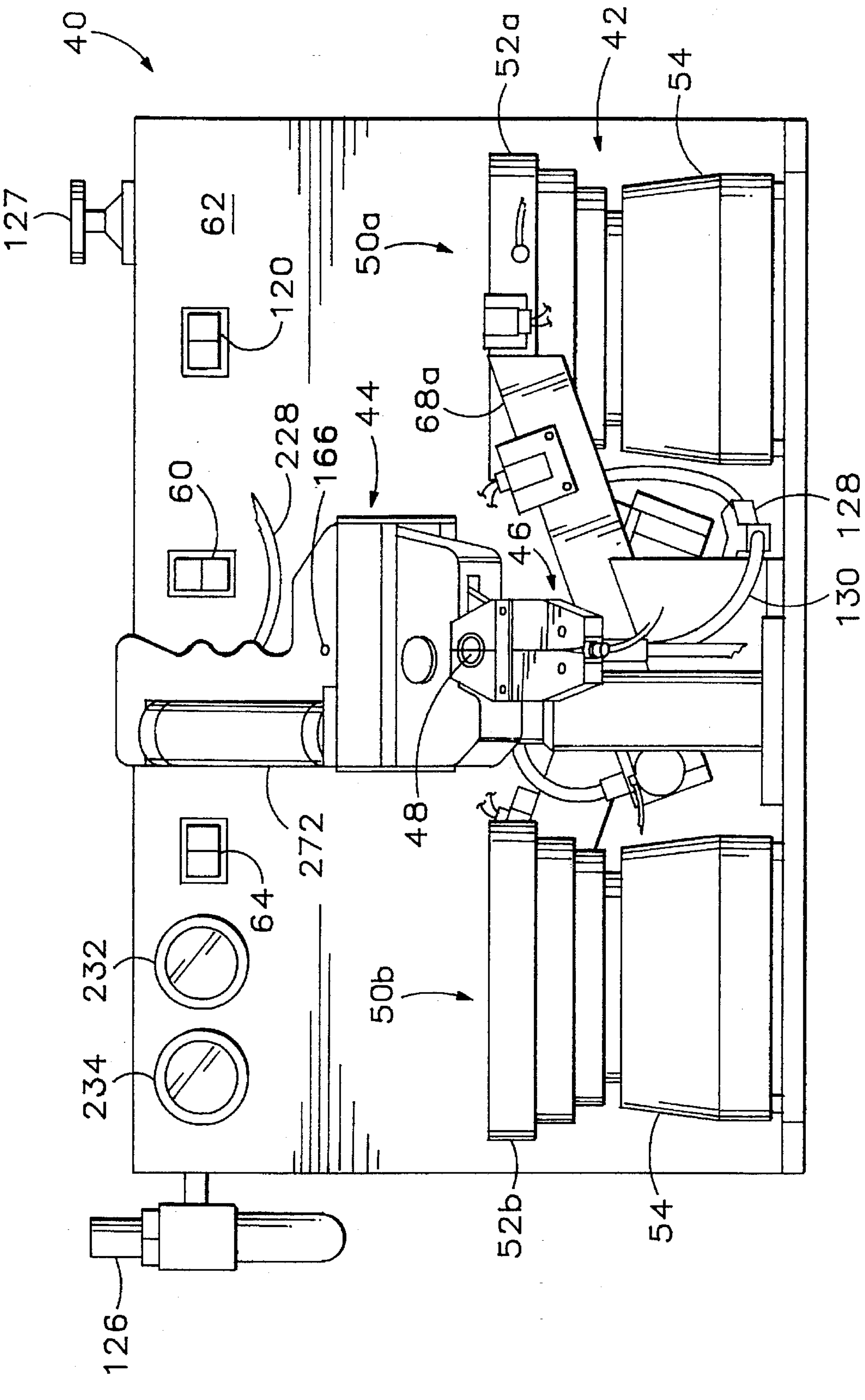
FIG. 1 is a front elevational view of an exemplary crimping system designed in accordance with the present invention.
Figures 7, 8, 10, 11:
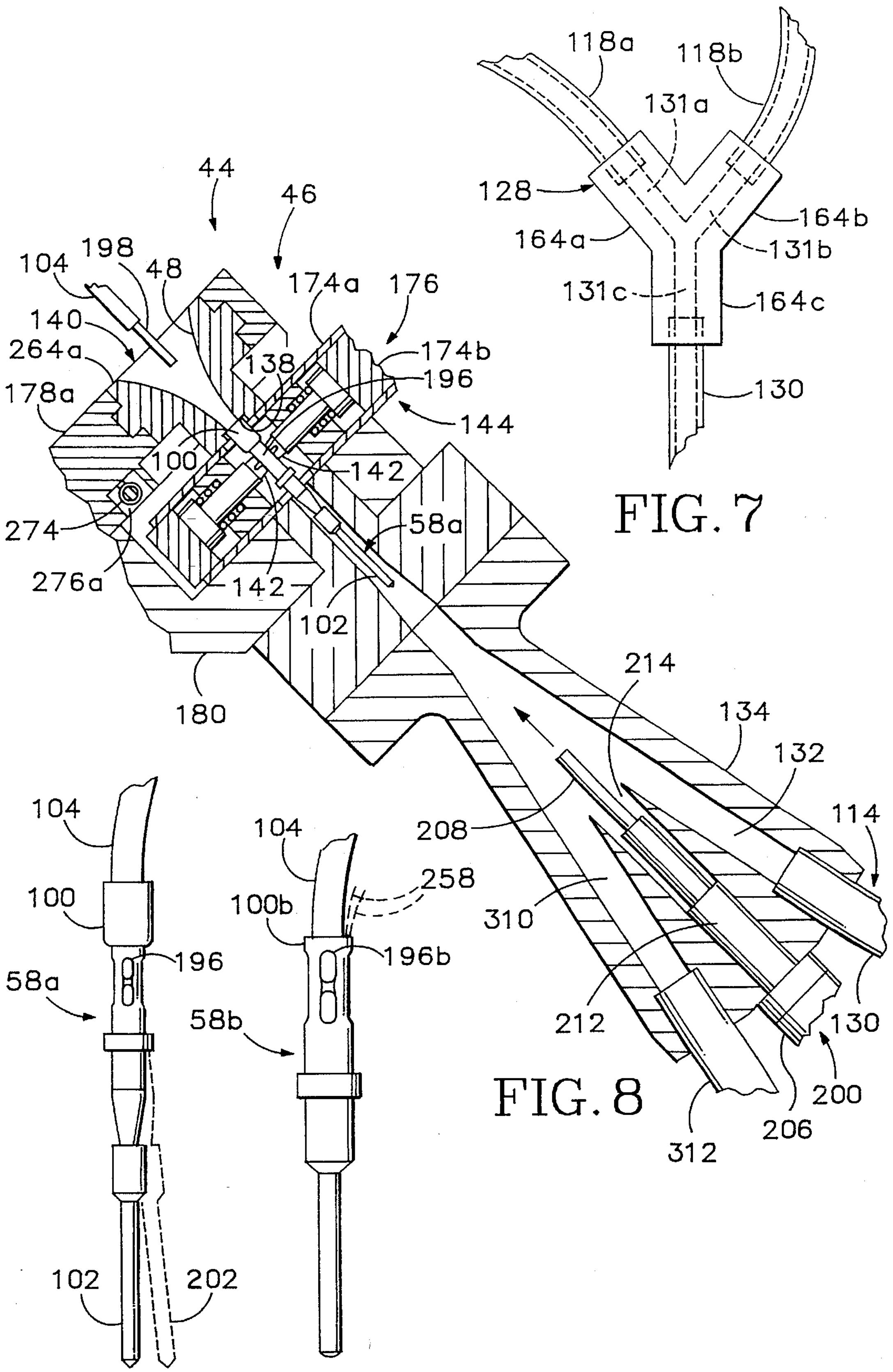

FIG. 7 is an enlarged plan view of the exemplary crossover unit that is part of the exemplary feeding assembly of the system shown in FIG. 1.

Figure 3:
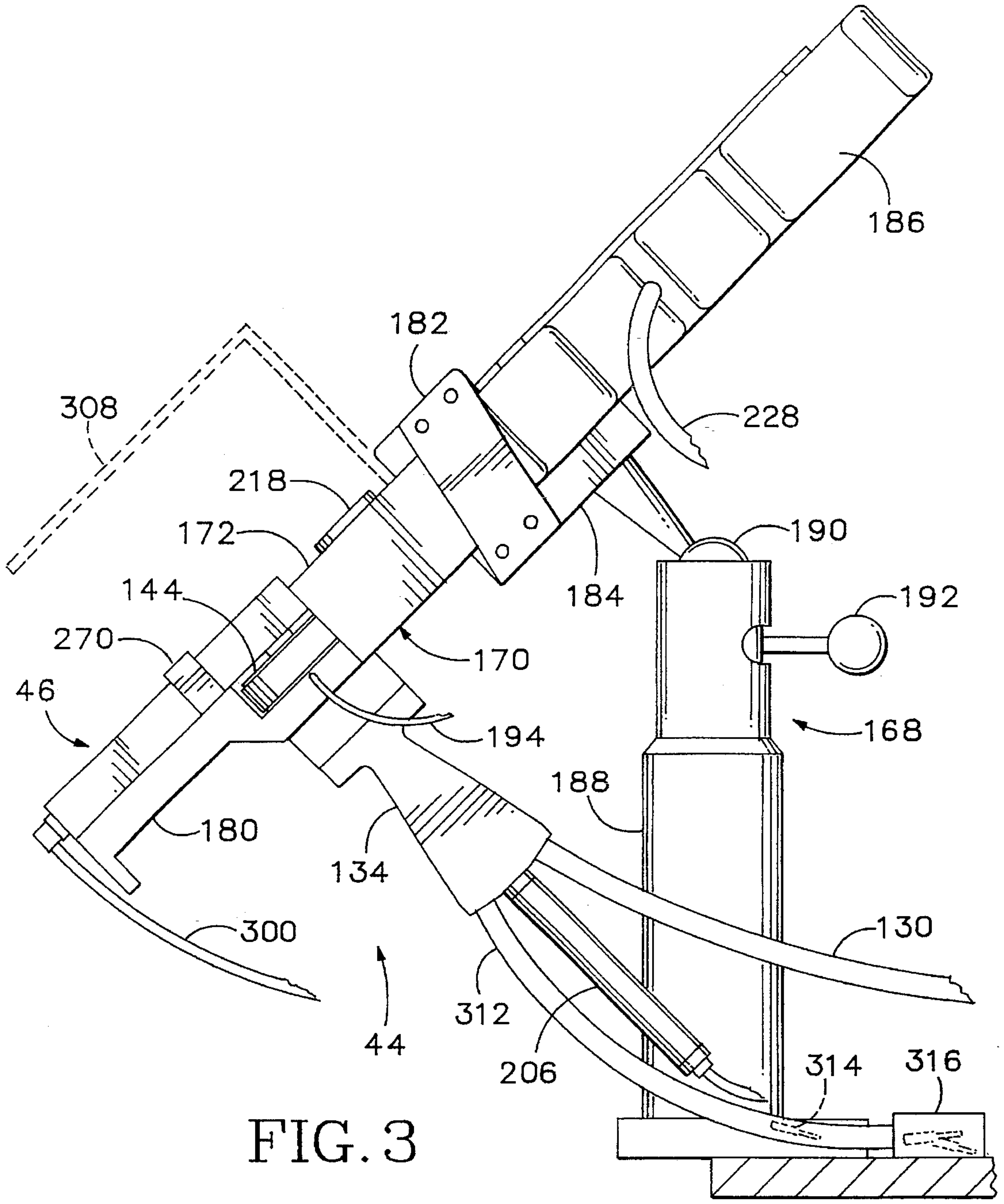
FIG. 3 is a side elevational view taken along lines 3—3 in FIG. 2 showing an exemplary crimping assembly and how it connects to the exemplary feeding assembly.

FIG. 8 is a broken-away sectional view taken at the juncture of the exemplary feeding assembly and crimping assembly, on a scale enlarged from that view of the juncture provided in FIG. 3, wherein, in accordance with the present invention, a contact has been introduced into the crimping assembly by passage through the feeding assembly and the crimping assembly has completed a portion of its crimping cycle in preparation for the insertion of a conductive wire end, also shown.

Figure 9:
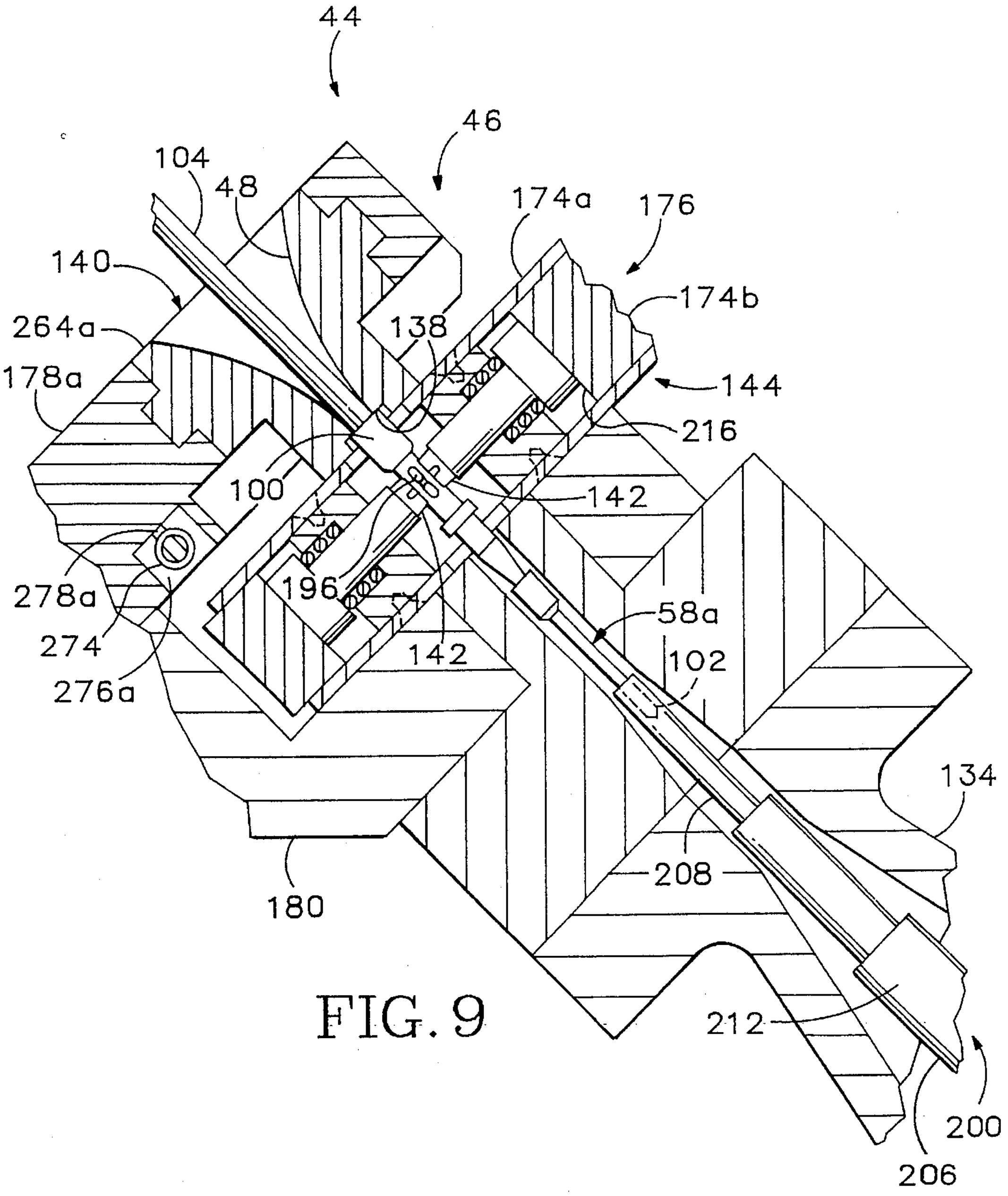

FIG. 9 is an enlarged sectional view of a portion of the feeding and crimping assemblies depicted in FIG. 8 which shows an exemplary contact-restraining mechanism that has been shifted to its operative position and which further shows the wire end fully inserted and the crimping assembly in its fully closed state for crimping the contact to the wire end.

FIG. 10 shows, in solid-line view, an elevational side view of a crimp made with one type of contact using the exemplary crimping system shown in FIG. 1 and indicates, in dashed-line view, how the crimp could be different for a conventional crimping system.

FIG. 11, shows, in solid-line view, a side elevational view of a crimp made with another type of contact using the exemplary crimping system shown in FIG. 1 and indicates, in dashed-line view, how the crimp could be different for a conventional crimping system.

Figure 12:
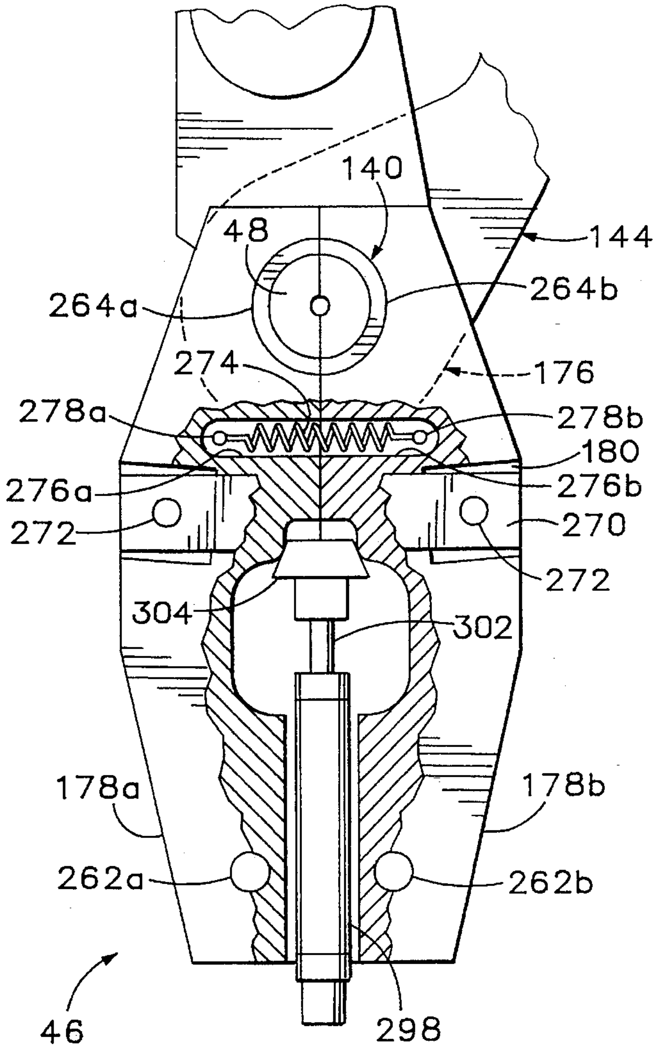

FIG. 12 is a plan view of the wire-positioning mechanism included on the system shown in FIG. 1 in which portions of the mechanism have been removed in order to reveal hidden details of its construction.

Figure 13A:
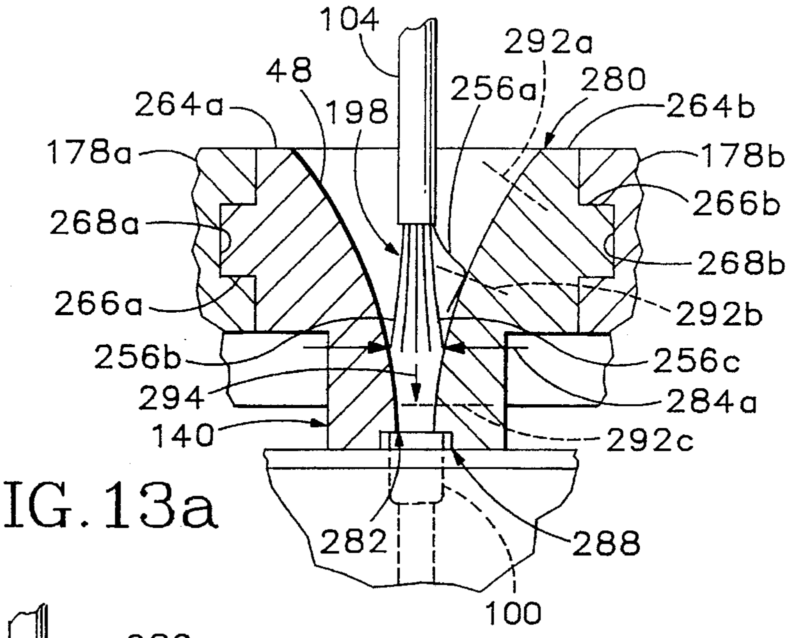

FIG. 13*a* is an enlarged sectional view of the wire-positioning mechanism taken along lines 13*a*–13*a* in FIG. 12 and shows a wire, depicted in solid line view, as it is being inserted through an exemplary channel formed by the wire-positioning mechanism and toward a prepositioned contact, depicted in dashed-line view.

Figure 13B:
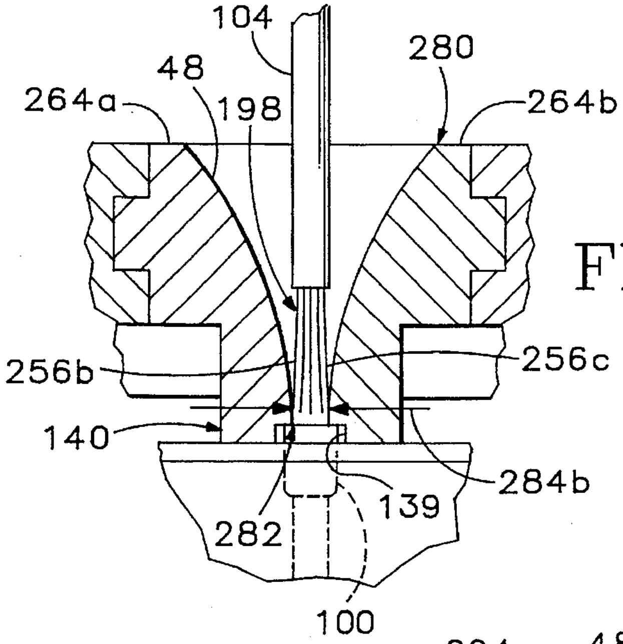

FIG. 13*b* is similar to FIG. 13*a* and shows the end of the wire after it has been further inserted into the exemplary channel.

Figure 13C:
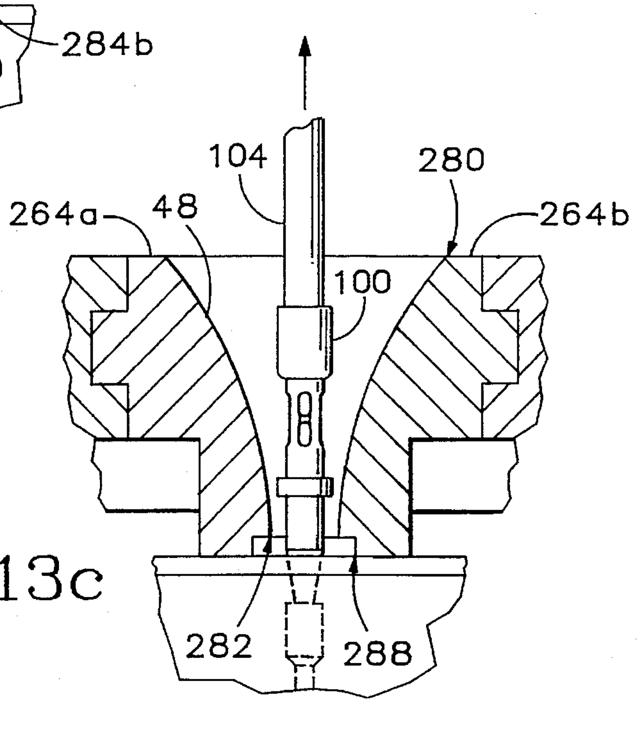

FIG. 13*c* is similar to FIG. 13*b* and shows the channel in its expanded condition and further shows how the end of the wire, with a contact attached to it, is withdrawn back through the expanded channel.

Figure 14:
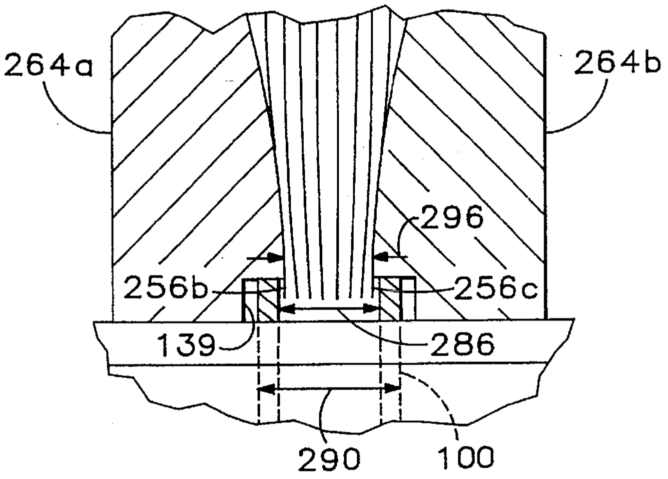

FIG. 14 is an enlarged sectional view of a portion of the channel shown in FIG. 13*b* that depicts the individual strands on the end of the wire just as they are being funneled into the cylindrically-shaped end of the contact.

Figure 15:
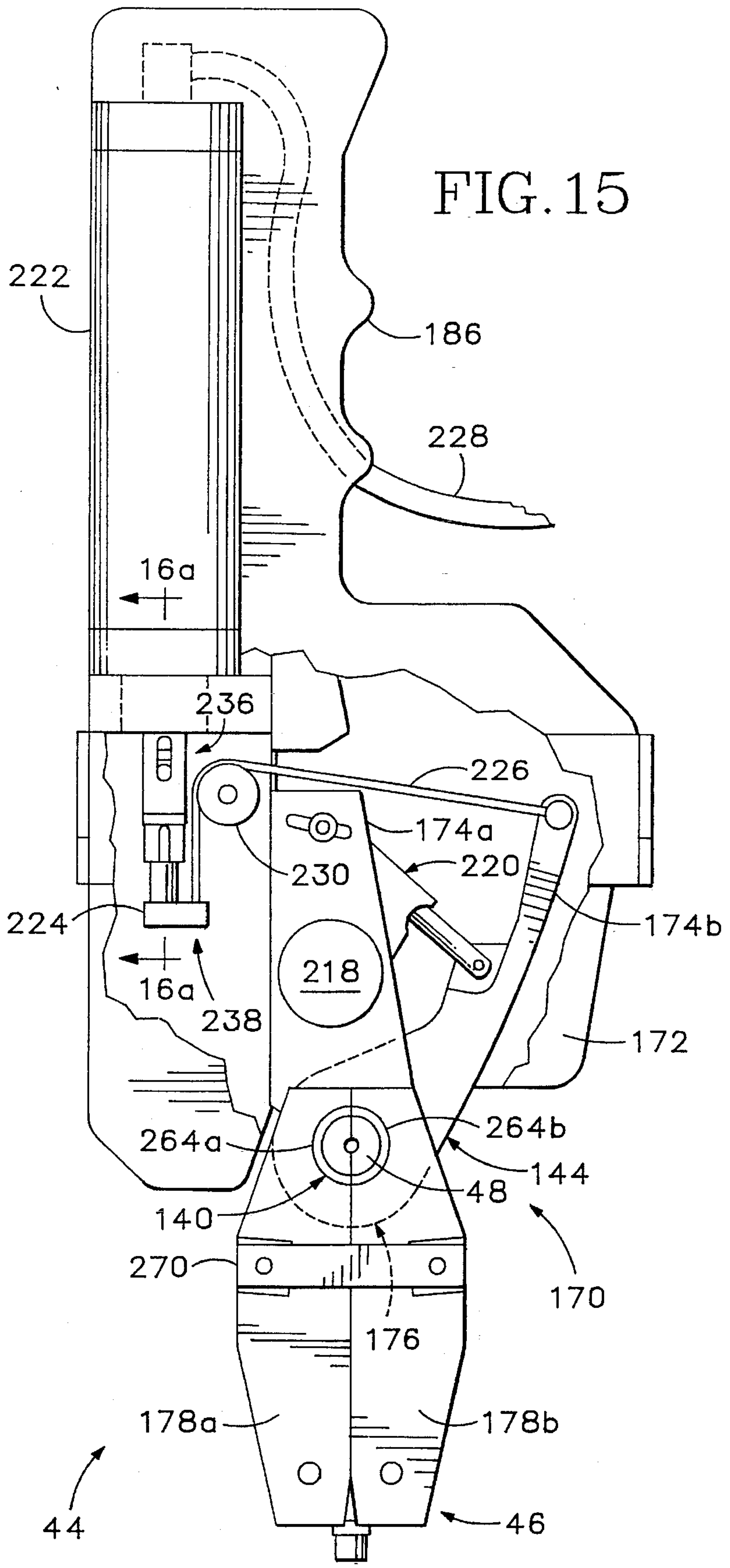

FIG. 15 is a plan view of the exemplary crimping assembly of the system shown in FIG. 1 where portions of the crimping assembly have been removed in order to show an exemplary drive mechanism preferably used for actuating the crimping assembly.

FIGS. 16*a*–16*d* are longitudinal sectional views each taken generally along line 16*a*—16*a* in FIG. 15 showing the operation of the drive mechanism at progressively later times.

DETAILED DESCRIPTION OF THE PREFERRED EMBODIMENT

FIG. 1 is a front view of an exemplary crimping system 40 which operates in accordance with the present invention. The crimping system 40 includes a feeding assembly 42 which is designed to be loaded with contacts and which feeds these contacts to an exemplary crimping assembly 44. The crimping assembly 44 includes an exemplary wire-positioning mechanism 46 which forms a channel 48 through which the operator can insert the conductive end of a wire in order to have the conductive end attached to a prealigned contact by a crimping operation performed fin the crimping assembly. This crimping operation can be initiated by the operator, such as via a foot-pedal control (not shown), or, alternatively, can be initiated automatically upon full insertion of the conductive end of the wire in accordance with conventional methods. After the crimping operation is performed, the operator removes the wire back through the channel 48, together with the crimped contact attached to it, and then repeats this basic sequence of operations with a new wire.

The above description of the basic sequence of operations is provided in order to clarify the relative arrangement of the basic parts of the exemplary crimping system 40. It will be recognized that this basic sequence is similar to that provided in conventional systems so that no additional training of the operator is required in order for the operator to use the exemplary system, at least in its most basic mode. It will further be noted that the term "contact," as used herein and in the claims, is intended to be interpreted in a broad sense, that is, this term is intended to encompass not only pin-type or collapsible-arm type contacts or other types of elements commonly referred to as contacts but also other terminating elements that are sometimes referred to by other names, such as lug-ended terminals or splices. Furthermore, as will be apparent from the description provided hereinbelow, the wire-positioning mechanism can be modified so as to accept more than one wire at a time in order that splice-type connections can be made. With respect to the term "conductive end," this term is intended to refer to any insertable portion of the wire, whether located at the extreme end or an intermediate end of the wire, that has been suitably prepared, as by stripping or by thermal processing, so as to expose a conductive surface Of the wire, which surface can itself be continuous or be formed by discrete subelements such as interwoven or parallel strands.

Referring to FIGS. 1 and 2 together, the exemplary feeding assembly 42 includes respective right-hand and left-hand contact-sorting assemblies 50*a* and 50*b* that are of equivalent construction and that operate in the same manner. As shown, each contact-sorting assembly 50*a* or 50*b* includes a corresponding bowl-shaped receiving bin 52*a* or 52*b*. These bins are each mounted on a commercially available vibratory unit 54, such as those sold by Automation Devices, Inc. based in Fairview, Pa. Each bin 52*a* and 52*b* has a spiralling shoulder or ramp 56 formed along its inner surface.

In accordance with the present invention, a loose batch of electrical contacts is loaded into each receiving bin 52*a* and 52*b* in such a manner that the contacts in each bin are disposed haphazardly in relation to each other. In some applications, it is preferable that each separate batch of contacts be of different type, as is indicated in FIG. 2 by the different right-hand and left-hand contacts 58*a* and 58*b*, respectively. In one common type of situation, for example, the operator may need to terminate the separate wires that form a larger wire bundle, where some of the wires need to be terminated for insertion into a male type plug and the others of the wires need to be terminated for insertion into a female type plug. Alternatively, the same type of contact can be used for each batch. This permits faster sorting than could otherwise occur with respect to that particular type of contact, as explained further hereinbelow.

In order to initiate the contact sorting cycle, the main power switch 60 on the control panel 62 for the crimping system is set to its "ON" position and a rocker switch 64, which is connected via an electronic control line to each contact-sorting assembly 50*a* and 50*b*, is toggled to its "RUN" position. This actuates each vibrator unit 54 so that the corresponding receiving bin 52*a* or 52*b* begins to vibrate. In response to such vibration, the contacts that are in each bin gravitate toward the bowl-shaped sides of the bin and begin to advance upwardly along the spiralling shoulder 56 due to the rapid dropping and turning motions that each supporting vibrator unit has been designed to impart. In this manner, then, the contacts are rearranged relative to each other, so that there is at least a group of contacts in each bin that are arranged one ahead of the other in a certain recognizable order relative to each other. In FIG. 2, for example, there is a first contact 58*c* which has arrived at an upper portion 66 of the spiralling shoulder, and this first contact is arranged ahead of a second contact 58*d*, which is arranged ahead of a third contact 58*e*, and so on. Referring also to FIG. 5, as each sorted pin advances past the upper portion, it falls into an inclined pin-feeding chute 68*a* where it is further processed.

In accordance with the present invention, as the contacts arrive at the upper portion 66, they are further sorted so as to remove any contacts which might be prone to jam the feeding assembly if allowed to pass. Referring to FIG. 4*a*, for example, although the first and fourth contacts 58*f* and 58*i* do not present a problem of this type, the second and third contacts 58*g* and 58*h* do because they are stuck together in end-to-end fashion and could therefore get jammed in the feeding assembly if they were allowed to pass.

Referring again to FIG. 4*a*, in order to remove nonconforming contacts of the type just described, a proximity monitor 70, such as of the type containing a photosensor 72, is mounted adjacent a forward location of the upper portion in order to detect, as through an opening 74 formed in the upright rim of the receiving bin, any contact passing by such forward location. In addition, a rejection mechanism 76, such as an air-delivery head 78 connected to a pneumatic line 80, is mounted adjacent a rearward location on the upper portion, so that contacts can be selectively removed from the upper portion, as by a blast of air delivered through a second opening 82 in the upper rim. In the preferred construction shown, the forward location is spaced apart from the rearward location by a distance that somewhat exceeds the length of an individual contact, and the proximity monitor and rejection mechanism are electronically linked so that whenever the proximity monitor detects a contact passing-by the forward location, it activates the rejection mechanism. The rejection mechanism will then remove any contact that is simultaneously passing by the rearward location.

If, for example, the contacts which are shown in FIG. 4*a* advance to the respective positions indicated in FIG. 4*b*, the photosensor 72 will detect the first contact 58*f* just as it starts to cross the opening 74 and thus will activate the air delivery head 78 which, in turn, will deliver a blast of air that will carry both the second and third contacts 58*g* and 58*h* back to positions in the center portion 84 of the bin. This is so even if the air blast, as indicated in FIG. 4*b*, is acting directly on only the second contact 58*g*, since the third contact 58*h*, being stuck to the second contact, will move in whichever direction the second contact is forced to move. Similarly, in FIG. 4*b*, if the second contact 58*g* had been stuck together to the first contact 58*f* instead of to the third contact 58*h*, then the blast of air, though acting directly on only the second contact, would have carried off both the first and second contacts. Hence, all pairs of nonconforming contacts are removed in accordance with this preferred systematic selection process even though sometimes a nonconforming contact will advance past the rejection mechanism before this mechanism is triggered in a sense, then, the rejection mechanism is capable of operating retroactively.

After the contacts that are in each bin have been sorted into consecutive arrangement and after, at the very least, all of the nonconforming ones of the contacts have been removed so that any contacts left are only of conforming type, these conforming contacts are then transferred into the pin-feeding chute 68*a*. That is, these conforming contacts continue to advance along the upper portion 66 until each is sufficiently far within the mouth 86 of the chute as to fall slidably down into the chute. These contacts are transferred to the chute in the same relative order which they had while they were arranged in the larger group that included the nonconforming contacts. Referring to FIG. 4*a*, for example, the conforming contact 58*f* is arranged ahead of the conforming contact 58*i*, though they are separated by nonconforming contacts 58*g* and 58*h*, and these two conforming contacts are later sent in the same order relative to each other to the pin-feeding chute 68*a*.

Referring to FIG. 4*a*, the pin-feeding chute 68*a* includes a pair of elongate outer side panels 88*a* and 88*b* inside of which a corresponding pair of inner shoulders 90*a* and 90*b* are provided. Between the panels and the shoulders, a narrow channel is formed through which one contact, at a time, can slidably travel under the urging of gravitational force. In particular, for the pin-type contacts shown in FIG. 5, the upper ledge 92 of each inner shoulder 90*a* or 90*b*, in cooperation with each other, effectively form a pair of tracks on which an enlarged intermediate section 94 of each contact is supported for travel.

As indicated in FIG. 5, in relation to the channel just described, a contact-orientating portion 96 and a contact-holding portion 98 are formed integrally with each other. Referring to FIGS. 4*a* and 5 together, the contact-orientating portion 96 ensures that each of the contacts that is received into the pin-feeding chute will be similarly oriented as it enters the holding portion 98 of the chute. For example, if the contact enters the chute with its base or barrel-ended portion 100 end first, then when its head or tip 102 advances beyond the upper portion 66, the contact will immediately pivot about its enlarged intermediate section 94, in the direction indicated in FIG. 5, so that the barrel-ended portion 100 is raised to a position perpendicular to the direction of travel. On the other hand, if the contact enters the chute with its head or tip portion 102 end first, as the contact advances, the heavier tip portion eventually will pivot downwardly about the enlarged intermediate section 94, this time in a direction opposite to that indicated in FIG. 5, so that once again the barrel-ended portion is raised.

As indicated in FIGS. 4*a* and 5, in accordance with the present invention, preferably a predetermined quantity of presorted contacts 58 is accumulated in the holding portion 98 of the pin-feeding chute 68*a* before the operator begins to perform a consecutive sequence of crimping operations. This preferred method enables the operator to remove selected contacts from the holding portion 98 at a faster rate than the holding portion is being replenished with new contacts. In other words, the operator can perform a consecutive sequence of separate crimping operations, using contacts removed from the holding portion 98, at a faster rate than the contact-sorting assembly 50*a* can reload the holding portion with presorted contacts. In accordance with this method, then, the operator is not forced to pause between separate crimping operations in order to give the contact-supporting assembly 50*a* time to complete its sorting cycle. In comparison to conventional processing methods which, as earlier described, can be characterized as using a "same-time processing" approach, the preferred method can thus be characterized as a "batch processing" approach, insofar as at least a certain number of the originally loaded batch of contacts are set aside as a group for rapid subsequent retrieval and use by the operator.

Referring to FIG. 2, although the exemplary processing method above has been described in relation to the right-hand contact-sorting assembly 50*a* and the corresponding right-hand pin-feeding chute 68*a*, analogous processing also occurs in relation to the left-hand contact-sorting assembly 50*b* and the left-hand pin-feeding chute 68*b*. In particular, the left-hand chute has a holding portion corresponding to the holding portion 98 (FIG. 5) of the right-hand chute. Thus a quantity of contacts can likewise be held in reserve in the left-hand chute for subsequent removal by the operator at a rate that is faster than the left-hand contact-sorting assembly 50*b* can reload the chute.

The use of two different chutes 68*a* and 68*b* enables the crimping system to accommodate two different types of contacts at the same time, that is, the dimensions of each chute are selected for compatibility with the size or type of contact to be loaded in the corresponding contact-sorting assembly. Hence, in the exemplary setup shown in FIG. 2, a batch of one type of pin contact, 58*a*, is loaded into the right-hand contact-sorting assembly 50*a* and another batch of a different type of pin contact, 58*b*, is loaded into the left-hand contact-sorting assembly 50*b*. The differences between these two types of contacts is even more readily apparent in FIGS. 10 and 11, which show how each contact appears after it has been crimped onto a respective wire 104. Although, in FIG. 2, the contacts are each of male type, in accordance with another common type of application, the embodiment shown can also be used for simultaneous processing of male-and female type contacts. Alternatively, the system 40 can readily be configured so that a single type of contact Can be loaded into both contact-supporting assemblies 50*a* and 50*b*. Then, when the operator nearly depletes the supply of contacts that are being held in one of the chutes, the operator can immediately switch Over and begin removing contacts from the other chute, thereby giving the first chute time to become fully reloaded again. In this manner, the operator can repeat the cycle indefinitely.

As the example just provided illustrates, from the standpoint of the operator, the efficiency of the crimping system 40 is optimized when both contact-sorting assemblies 50*a* and 50*b* are operating simultaneously, so that contacts are being rearranged and transferred to each chute simultaneously. The same statement about efficiency can be made where different types of contacts are used, provided that roughly equivalent numbers of crimping operations will be performed with each type of contact.

It may be noted that conceivably two different contact-sorting assemblies 50*a* and 50*b* could be joined together so that both feed contacts into a single chute. However, this alternative approach is not as flexible as that shown in FIG. 2, insofar as under this approach the operator lacks the option of processing two or more types of contacts.

In certain conventional systems, even when the operator is not performing crimping operations, it is necessary for the operator to stand by and to continue monitoring the operation of the feeding assembly, so that if any jamming or contact spillover conditions occur, these conditions can be immediately corrected. The exemplary system 40 shown in FIGS. 1 and 2, however, provides mechanisms for preventing such conditions. Accordingly, even after the operator has initiated the operation of each contact-sorting assembly 50*a* and 50*b* in order to begin building up a reserve of presorted contacts (i.e., by setting the switch 64 to its "RUN" position), the exemplary feeding assembly 42 can be left unattended. The operator is then free to perform other tasks and can return to the unit at the time most convenient for the operator.

Referring to FIG. 4*b*, it has already been described how the proximity monitor 70 and the rejection mechanism 76 cooperate together to remove contacts that have become stuck together, so as to prevent jamming in the system. In order to prevent contact spillover, which condition can occur if either pin-feeding chute 68*a* or 68*b* is overloaded with an excessive number of contacts 58, a queue-length detecting assembly 106 is provided along each chute. In the preferred embodiment shown, this assembly includes a proximity monitor 108, such as of the type that contains a photosensor 110, which photosensor is mounted across from a window or cutout 112 in the chute. With respect to the operation of the queue-length detecting assembly 106, when, for example, the contacts 58*f* and 58*i* of FIG. 4*b* are transported from their solid line positions on the sorting assembly to their dashed-line positions in the chute, the photosensor 110, upon detecting this condition, will generate a "FULL" signal. This "FULL" signal overrides the "RUN" setting of the panel switch 64, so that the corresponding contact sorting assembly 50*a* is automatically shut off. In the exemplary system shown, this "FULL" signal is generated by the photosensor 110 when 55 pin-type contacts have been accumulated in the chute (this number roughly corresponds to the number of individual wires in a full-size wire bundle). Conversely, if contacts are removed from the chute, the photosensor generates a "RELOAD" signal, which turns the contact-sorting assembly automatically back on, provided that the rocker switch 64 is still set in the "RUN" position.

The feeding assembly 42 preferably has the capability to successively remove and transport contacts that have been accumulated in either chute 68*a* or 68*b* from that chute to the crimping assembly 44 at a rate of transfer exceeding the maximum rate at which the operator can perform crimping operations, so that the operator will not have to pause between crimping operations in order to allow time for these removal and transfer operations to take place. Besides this ability to transport contacts quickly, preferably the feeding assembly 42 is also able to handle contacts which are of different sizes and types. The exemplary feeding assembly 42 shown in FIG. 2 satisfies these twin objectives by providing a high-speed pneumatic transporting system 114.

Figure 6B:
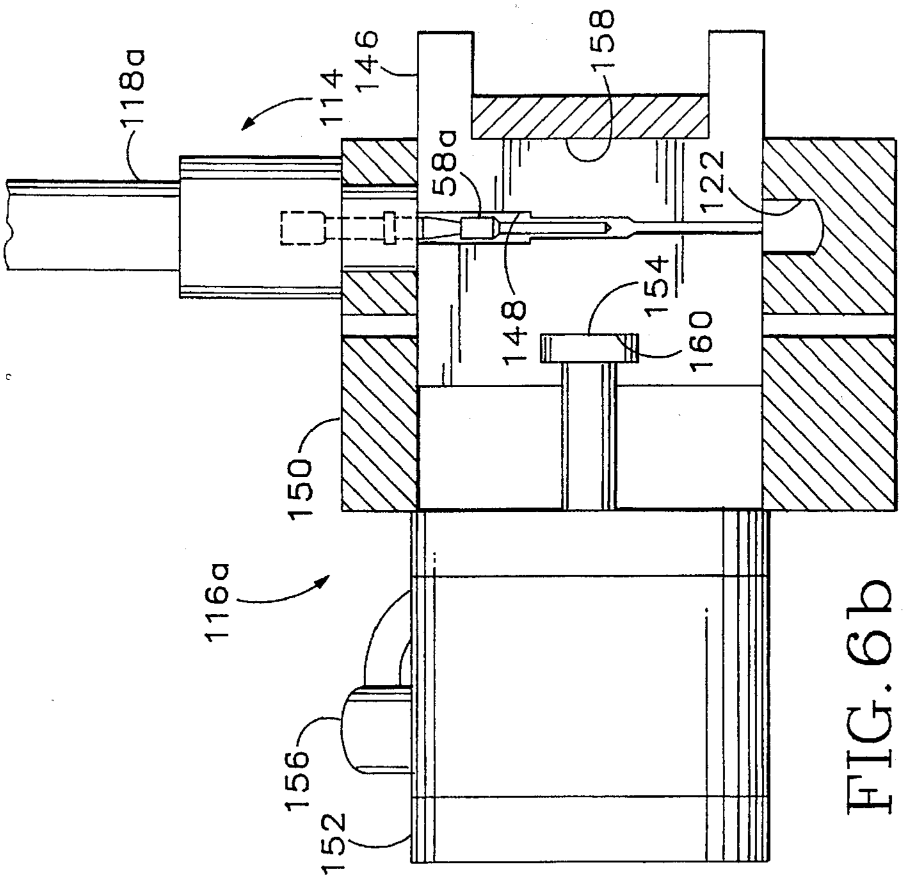
Figure 6A:
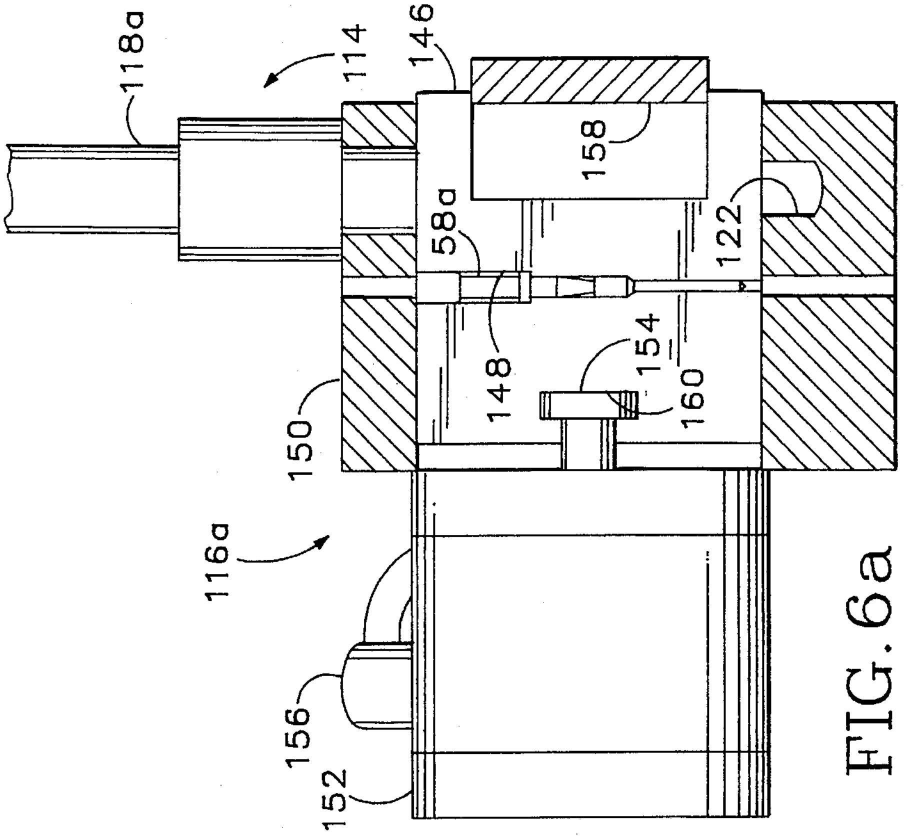

Referring to FIGS. 2 and 6*a* together, in order to rapidly introduce selected contacts into the pneumatic transporting system 114, a pneumatically-operated removing unit 116*a* and 116*b* is mounted along the forward end of each corresponding pin-feeding chute 68*a* and 68*b*. Each removing unit 116*a* and 116*b* removes contacts individually from the holding portion 98 of the corresponding chute and, as indicated in FIG. 6*b*, shifts each removed contact (e.g., 58*a*) to a position in alignment with a respective entry line tube or pathway 118*a* or 118*b*, through either of which pathways the transporting system can be alternately entered. Whether, at any particular time, entry line 118*a* or entry line 118*b* is being used will depend on which removing unit 116*a* or 116*b* is currently in operation. This, in turn, will depend on whether the "RIGHT" setting (to select unit 116*a*) or the "LEFT" setting (to select unit 116*b*) has been selected on a second rocker switch 120 mounted on the front panel 162 of the system.

Referring to FIG. 6*b*, after being aligned with a respective entry line tube 118*a* or 118*b*, the contact 58*a* being processed is immediately propelled explosively from its seated position within the removing unit for extremely rapid movement or flight, starting in the direction indicated in the figure, through the entry line tube. This propelling action occurs because the end of the contact opposite the entry line tube 118*a* encounters a high-pressure blast of air which is supplied via a pressurized pneumatic chamber 122. Referring to FIGS. 1 and 2, the high-pressure air for the pneumatic chamber, as well as for the other pneumatic components in the system 40, is supplied to the system via a primary pneumatic pressure line 124 that is connected to a primary pressure-regulating and filtering unit 126 that is part of the system. For safety purposes, a push-down switch 127 is provided so that the operator can, in an emergency, immediately shut off all the pneumatic components of the system.

Referring now to FIGS. 2, 3 and 7, almost immediately after it enters a respective entry line tube 118*a* or 118*b*, the propelled contact automatically crosses over into a common exit line tube or pathway 130 that is also included in the pneumatic transporting system 114. A crossover unit or Y-manifold 128 (FIG. 7) enables this high-speed cross over operation to occur. That is, if the propelled contact enters the crossover unit through entry line 118*a*, it will automatically be routed along respective inner passages 131*a* and 131*c* in the unit, even as it is being propelled through the unit, so as to depart through exit line 130. Similarly, if the propelled contact enters through entry line 118*b*, it will automatically be routed, this time along respective inner passages 131*b* and 131*c*, so as to again depart at exit line 130. The preferred embodiment of the crossover unit shown is inexpensively formed from a single block of transparent plastic material.

In accordance with the just described high-speed cross over operation, the contact is rapidly propelled, regardless of its particular departure position, toward a single predetermined position in alignment with the crimping jaws of a single crimping mechanism. In particular, referring to FIGS. 3 and 8 together, from the Common exit line tube 130, the contact is propelled into the upper channel 132 of a junction member 134 that joins the pneumatic transporting system 114 and the crimping assembly 44. The propelled contact, which continues to move quickly under the impetus of a continued air blast, travels through and past the upper channel 132 until it is abruptly stopped or caught, as shown, preferably by an inner face or shoulder 138 formed by a wire-positioning guide 140. Referring also to FIG. 13*b*, in addition to engaging the inner face 132 of the guide, the contact also enters a prealignment cavity 139 formed in the guide (since equal air pressure on all sides of the contact serves to center the contact in relation to the cavity). In this manner, then, the contact is automatically and immediately prealigned, both longitudinally and transversely, with respect to an open set of opposing jaws 142 that are included on the crimping assembly. (At the moment of impact, the crimping jaws 142 are open but soon thereafterwards they partially close to the position shown in FIG. 8.) From the description just provided of the operation of the exemplary transporting system 114, it will be appreciated that this transporting system can, without difficulty, transport contacts to the crimping assembly 44 at a faster rate than they can be used by the operator for consecutive crimping operations.

In relation to the other objective of accommodating different sizes and types of contacts, preferably tubing of oversized inner diameter is used for both the entry line tubing 118*a* and 118*b* as well as for the exit line tubing 130. In addition, referring to FIGS. 2 and 7, the inner passages 131*a*, *b* and *c*, that are formed within the corresponding legs 164*a*, *b* and *c* of the Y-crossover unit 128, preferably each have a diameter conforming to the oversized inner diameter of the entry and exit line tubing 118*a*, 118*b* and 130. Accordingly, the crossover unit is likewise able to accommodate different sizes and types of contacts. Referring now to FIGS. 6*a* and 6*b*, each removing unit, such as 116*a* shown, includes a shuttle member or valve 146 that forms a seating cavity 148. The seating cavity seatably positions the contact for shifting travel to a position in alignment with the corresponding entry line 118*a* or 118*b*. In particular, the shuttle valve 146 is driven slidably within an outer housing 150 by a pneumatic cylinder unit 152. The rod 154 of the unit extends when pressurized air is delivered to the unit via a pneumatic fitting 156, where the outward limit of extension is defined by a position of interfering engagement between the valve 146 and a stop surface 158 on the outer housing 150. The rod 154 of the cylinder unit retracts under the bias of an internal return spring (not shown). The cylinder unit 152 is mounted on the housing 150 by screws (not shown) which are removable. Thus the valve can be slid to a position outside the housing and removed from the cylinder unit by sliding the rod out of a slot 160 formed in the valve. This permits interchangeability of shuttle valves so that a shuttle valve can be selected having a seating cavity 148 that conforms to the dimensions of whatever type and size of contact is to be transported.

Referring now to FIGS. 8 and 13*b*, as will be further explained below, the wire-positioning guide 140 is interchangeably mounted. Thus the dimensions of the inner face 138 and prealignment cavity 139 can be selected so that they are properly sized for performing their aforedescribed catching and prealignment functions in accordance with the size and type of contact being transported. Hence it will be recognized that each of the various structures along which a contact can travel from the moment it leaves its holding chute to the moment it arrives in predetermined alignment with the crimping jaws is so designed as to be able to accommodate different sizes and types of contacts.

In accordance with the present invention, one important feature that contributes significantly to the high processing speed of the feeding assembly 42, though it is not a part of the pneumatic transporting system 114, is the high speed of interaction that can occur between, on the one hand, each removing unit 116*a* and 116*b* and, on the other hand, any contacts that have accumulated in the holding portion of the corresponding chute 68*a* or 68*b*. Referring to FIGS. 4*a* and 5, this fast interaction is made possible by the queued arrangement that the contacts 58 assume while they are being held in the holding portion 98 of the chute. In accordance with this queued arrangement, the contacts maintain a mutually touching, in-line relationship to each other.

Referring to FIG. 6*a*, the depth of the seating cavity 148 formed in the shuttle valve is only deep enough to receive one contact to ensure that only one contact at a time is delivered to the entry line 118*a* or 118*b* of the pneumatic transporting system 114 (FIG. 2). Referring to FIGS. 4*a* and 6*b* together, this shallow seating cavity 148 opens toward the queue of contacts, so that when the shuttle valve has just returned with its cavity empty, the next contact in the queue, due to gravitational force only, will automatically shift slidably into the empty cavity. At the same time, each of the other queued contacts in the holding portion slidably shift forward, so that each assumes the same position last held by the contact just ahead of it. For example, in FIG. 4*b*, the contact 58*i* would shift to the position last held by the contact 58*f*, and so on down the line. Accordingly, when the shuttle valve 146 once again extends (FIG. 6*b*) and then returns (FIG. 6*a*), the next contact it needs is immediately at hand, since this next contact has already assumed the closest available position adjacent to (but still outside of) the cavity (e.g., the position vacated by the contact that the shuttle valve has just removed). With this "self-feeding" system, then, little time is lost in moving contacts to the shuttle valve, thus permitting efficient high-speed operation of the valve.

Perhaps even more significantly, the single-channel, self-feeding system just described eliminates any need for a feed-assisting mechanism in the holding portion 98. By way of illustration, one type of feed-assisting mechanism could be a turret-type member having multiple contact-receiving slots and being rotatable to advance each received contact toward the removal mechanism. Not only would this type of mechanism be less efficient at transferring contacts than the exemplary queue system just described, but also this mechanism would be prone to jamming, to excessive wear and to other maintenance problems which are completely eliminated in accordance with the self-feeding system just described.

Referring to FIG. 2, prior to beginning crimping operations, preferably the contact-sorting assemblies 50*a* and 50*b* are switched "ON" and are left to run for some period of time. This is done in order to fill each pin-feeding chute 68*a* and 68*b* with presorted contacts, as shown in the figure. Because of the jam-preventing and "full chute" automatic shut-off features described above, the operator is free to leave the contact-sorting assemblies alone while they are running. In order to prevent dust or other extraneous items from dropping into either receiving bin 52*a* or 52*b*, particularly while the contact-sorting assemblies are being left unattended, a lightweight dust cover (not shown) can be optionally provided to house the bins as well as each of the pin-feeding chutes 68*a* and 68*b*.

When the operator returns to the crimping system 40 and is ready to perform the first crimping operation, the operator toggles the second rocker switch 120 from its "OFF" center position to either the "RIGHT" position or the "LEFT" position, depending on which type of contact (e.g., 58*a* or 58*b*) is needed for termination. For example, if the operator toggles the switch to the "RIGHT" position, the removing unit 116*a* immediately removes a contact 58*a* from the pin-feeding chute 68*a*, which contact is then rapidly propelled through the pneumatic transporting system 114 to a prealigned position relative to the crimping jaws in the crimping assembly 44. An indicator light 166 signals the arrival of the contact and thus lets the operator know that the wire-positioning mechanism 46 is ready to accept, through the wire-positioning channel 48, the end of the first wire to be terminated.

Referring again to FIG. 3, the exemplary crimping assembly 44 is supported on an exemplary support mechanism 168 so that the operator can adjustably position the crimping assembly to that particular position most comfortable for the operator. The major components of the crimping assembly 44 include the wire-positioning mechanism 46 and the crimping mechanism 170.

Referring also to FIG. 15, a crimping tool 144 of conventional type is partially mounted within a main housing 172 of the crimping mechanism 170 so that both of the lever arms 174*a* and 174*b* of the tool are inside the housing while the crimping head 176 of the tool forwardly extends outside through an opening in the housing. The wire-positioning mechanism 46 includes a pair of upper side members 178*a* and 178*b* movably mounted on a base member 180, where-the base member 180 is connected to the underside of the round crimping head 176.

A clamp 182 attaches the main housing 172 of the crimping mechanism to a movable platform 184 that is part of the exemplary support mechanism 168. Referring also to FIG. 2, the main housing includes a side margin 186 of undulating shape so that the operator can conveniently grip the housing with his or her fingers in order to move the wire-positioning mechanism 46 and the crimping mechanism 170 in unison with each other to the position most comfortable for the operator and in accordance with the range of movement accommodated by the movable platform 184. With respect to the exemplary support mechanism 168 shown, the movable platform 184 is connected to a stationery upright support 188 by means of a ball joint 190. Accordingly, the movable platform will flexibly accommodate movement of the wire-positioning and crimping mechanisms along three separate imaginary planes of movement in mutually perpendicular relationship to each other. These movements include forward-to-rearward movement along a first vertical tilt plane, side-to-side movement along a second vertical tilt plane which is perpendicular to the first and rotational movement along a horizontal plane which is perpendicular to both of the vertical planes.

A lever arm 192 is also provided that can be rotated by the operator so as to wedgeably lock the ball joint against movement in order that the movable platform 184 can hold the desired position. The transfer line tubing 130, along which contacts are transferred to the crimping assembly 44, is preferably of flexible type, as are also the other lines 206 and 312 which couple to the crimping assembly through the junction member 134, so as not to interfere with the type of positional adjustments just described.

Referring to FIG. 2, after adjusting the crimping assembly 44 to that position which is most comfortable, the operator inserts the conductive end of the wire to be terminated fully into the wire-positioning channel 48 and then initiates the crimping operation, as via a foot-pedal control (not shown). The operator then withdraws the conductive end of the wire together with the crimped contact that is now attached to it. This removal of the first Crimped contact is detected by a proximity monitor, such as a photosensor, which monitor, in response, sends a "CLEAR POSITION" signal to the electronic processing unit 193 of the system via the monitor's output line 194 (FIG. 3).

In response to the "CLEAR POSITION" signal, the particular removing unit 116*a* or 116*b*, which was previously selected at switch 120, removes the next contact from the corresponding chute 68*a* or 68*b*. Referring also to FIG. 8, this next contact (e.g., 58*a*) is pneumatically propelled through the transporting system 114, so that it shoots up the upper channel 132 and abruptly stops or is caught by the inner face 138 of the wire-positioning guide 140, as previously described. As also previously described, the equal air pressure that surrounds the sides of the contact centers the contact relative to the prealignment cavity 139 (FIG. 13*b*) thus ensuring that the head portion 100 of the contact engages the cavity at impact. In this manner, the portion of the contact designed to be crimped 196 is properly prealigned, both longitudinally and axially, with the crimping jaws 142 (which, at the moment of impact, are still open). The proximity monitor or photosensor that is mounted adjacent the crimping tool 144 immediately detects the presence of this next contact and, in response thereto, changes the signal on its output line 194 (FIG. 3) from the "CLEAR POSITION" signal to an "IN POSITION" signal.

Referring to FIGS. 8 and 15 together, the electronic processing unit 193 (FIG. 2) of the crimping system 40, in response to the "IN POSITION" signal, immediately actuates the crimping mechanism 170 so that, in accordance with the present invention, the crimping mechanism partially closes in a manner such that the crimping jaws 142 firmly grip the portion of the contact designed to be crimped 196 without actually crimping (e.g., deforming) such portion. This ensures that when the operator subsequently initiates the full crimping operation, the correct portion of the contact will be crimped. In other words, this prevents the type of miscrimp that can occur in conventional systems when the conductive end 198 of the inserted wire 104 snags the base portion 100 of the contact, thereby pushing the contact back and causing the base portion to be crimped instead of the correct portion 196.

In response to the "IN POSITION" signal, the electronic processing unit 193 also shuts off the source of the pressurized air that originally propelled the contact through the pneumatic transporting system 114. This shut-off operation is delayed just long enough to ensure that the crimping jaws 142 have had sufficient time to firmly grip the correct portion 196 of the contact.

In response to the "IN POSITION" signal, the electronic processing unit 193 also actuates a head-restraining mechanism 200, again after a slight delay so that the crimping jaws 142 have time beforehand in which to firmly grip the contact. The purpose of the head-restraining mechanism is to physically restrain the head or tip portion 102 of the contact while the crimping jaws 142 are being fully closed, so that the head portion of the contact is maintained in predetermined alignment with the portion to be crimped 196 throughout full closure of the crimping jaws. More specifically, with respect to the pin-type contact 58a shown in FIG. 8, the purpose of the head-restraining mechanism is to maintain the head portion 102 and the portion to be crimped 196 (which respective portions are both cylindrical in shape) in concentric alignment with each other.

The head-restraining mechanism 200 prevents the type of miscrimp indicated in dashed lines in FIG. 10 in which the head portion 202 of the miscrimped contact is significantly out-of-alignment with the position of its base portion, here understood to be indicated by reference numeral 100. This type of "crooked" contact can result in connector mating problems and even possibly cause electrical shorting to occur. It may be noted that for some types of contacts, such as the pin-contact shown in FIG. 11, the consequences of contact bending are not quite as severe, because such contacts have a base portion **100*b* that does not extend as far back from that portion 196*b*** designed to be crimped. It may further be noted that this type of contact bending does not relate to some deficiency in the crimping mechanism but relates, instead, to the uneven stresses that can normally arise between different sides of a contact during crimping depending, for example, on which direction the individual strands of the wire end shift as the sides are being deformed inwardly.

Referring to FIGS. 3 and 8 together, the head-restraining mechanism 200 includes a pneumatically-actuated cylinder 206 to the rod 212 of which is mounted a hollow sleeve 208. When the head-restraining mechanism is actuated, that is, shortly after the contact arrives at its prealigned position between the crimping jaws 142, the rod 212 of the cylinder 206 rapidly extends through and beyond the center channel 214 of the junction member 134, thereby causing the hollow sleeve to snugly engage telescopically the head portion 102 of the contact, as shown in FIG. 9. Accordingly, the head portion is restrained against bending of the type above described.

Referring to FIG. 15, the crimping tool 144 of the crimping mechanism 170 is, as previously mentioned, of conventional design. In the preferred embodiment shown, the crimping tool is of the eight-indenter military-standard type sold by Astro Tool Corporation based in Beaverton, Oreg. As the respective lever arms **174*a* and 174*b* of the tool are brought toward each other to their fully closed position, this brings the opposing jaws 142 contained in the crimping head 176 together, first from an open position clear of the contact, then to a contact griping position shown in FIG. 8 and finally to a contact deforming or crimping position shown in FIG. 9**.

Referring to FIGS. 8, 9 and 15 together, the jaw-closing action just described occurs because a generally annular inner cam surface 216 is formed by the inner lever arm **174*b* on a forward portion of such arm. This forward portion, together with the forward portion of the other arm, forms the crimping head 176. As the inside lever arm 174*b* is moved toward the outside lever arm 174*a*, a progressively thicker section of the inner cam surface rotates into engagement with the base portion of each jaw 142, thereby compressing the jaws toward each other against the bias of a return spring. An indexed dial knob 218 on the tool adjusts the minimum (full closure) distance of approach of the respective lever arms and thus determines the maximum depth of penetration that the pair of indenters on each jaw 142 will achieve into the sides of the contact during the crimping operation. The crimping tool 144, in conformance with military requirements, further includes a rachet mechanism 220** which prevents the lever arms from opening unless the lever arms have completely reached their fully closed position. This is done to ensure that each contact crimped by the tool will be fully, and not just partially, crimped.

It is desirable that jaw closure be performed as quickly as possible so that, for example, the contact is not pushed backward by an inserted wire before the jaws are able to firmly grip the contact. To achieve this closure speed, a pneumatically actuated drive cylinder 222 is used for closing the respective lever arms **174*a* and 174*b*. Referring to FIG. 15, the actuating member or movable rod 224 of the cylinder is connected to the inside lever arm 174*b* by a flexible interconnect line 226, such as steel cable. The outside lever arm 174*a* is connected to the main housing 172 in stationery position relative to the drive cylinder 222. In order to operate the drive cylinder, the cylinder is connected to a supply of pressurized air via a pressure line or hose 228. This forces the rod 224 to extend and draws the interconnect cable 226 across a pulley 230 in such a manner as to pull the inside lever arm 174*b* toward the fixedly mounted outside lever arm 174*a*, thereby causing the crimping jaws 142** to close.

It will be recognized that the amount of pressure exerted by the crimping jaws 142 will relate to the pulling force which the actuator rod 224 applies to the inside lever arm **174*b* which, in turn, will relate to the pressure level of air being supplied to the cylinder 222. In accordance with conventional air-pressure adjustment methods, this pressure level is made adjustable in order that a full close (crimping) pressure can be provided of about 85 psi and a considerably lower partial close (contact gripping) pressure can be provided in the range of between about 8–15 psi. Within the range given, the particular level of partial close (contact gripping) pressure that is selected is based, for example, on the thickness of the metal used for forming the contact to be gripped. With respect to the full close (crimping) pressure, only one pressure setting is needed, since the depth of penetration of the crimping jaw indentors into the contact will be limited by the setting of the dial knob 218 on the crimping tool, as above described. The only requirement on the full close (crimping) pressure is that it be large enough to achieve the maximum depth of penetration that the operator is able to select. Referring to FIG. 1, a dial gauge 232 is provided so that the operator can monitor the level of partial close (contact gripping) pressure. A similar dial gauge 234** permits the operator to assess the air pressure in relation to the other pneumatic components in the crimping system.

With respect to cable-drawn tool-closing systems generally, a significant problem has been the susceptibility of the cable to premature failure in certain modes of operation. In relation to the pneumatically drawn cable system of the present invention, for example, if the air pressure to the pneumatic cylinder 222 suddenly drops before the crimping tool 144 has reached its fully closed position, such as because of power loss to the system, the internal return spring in the cylinder will, in the absence of opposition from any other mechanism, retract the actuating rod 224. Because the tool-based rachet mechanism 220 will, prior to full closure of the tool, prevent the lever arms from reopening, as described above, this will cause the ends of the cable 226 to be drawn back together so that one or more center portions of the cable can double back on themselves or become snarled within the cramped confines of the main housing 172 so as to establish localized regions of high stress along the cable. When air pressure is then resumed and the cable is jerked taut again by sudden reextension of the actuating rod 224, the stressed portions of the cable can then snap, particularly if these portions have already been fatigued by earlier occurrences of similar type.

Referring to FIG. 15, in order to overcome this problem of premature cable failure, in accordance with the present invention, a second rachet mechanism 236 is included on the pneumatic cable-drawing mechanism 238 in order to compatibly compensate for the action of the first rachet mechanism 220 based on the crimping tool. Referring also to FIG. 16*d*, this second rachet mechanism is mounted on the end of the drive cylinder 222 for ratcheting engagement with the actuating rod 224. Just as the first rachet mechanism prevents the lever arms 174*a* and 174*b* from reopening before they have reached their fully closed position, in similar manner, the second rachet mechanism 236 prevents the actuating rod from retracting before the rod has reached its fully extended position. Thus, if the air pressure supplied to the pneumatic cylinder should drop for any reason while the rod 224 is in the process of extending, instead of retracting against the bias of the internal return spring, the rod, like the lever arm 174*b*, holds its position so that the interconnect cable 226 remains taut. Accordingly, the cable is not subject to the type of premature cable failure that can occur when the cable is allowed to become slack.

Figure 16A:
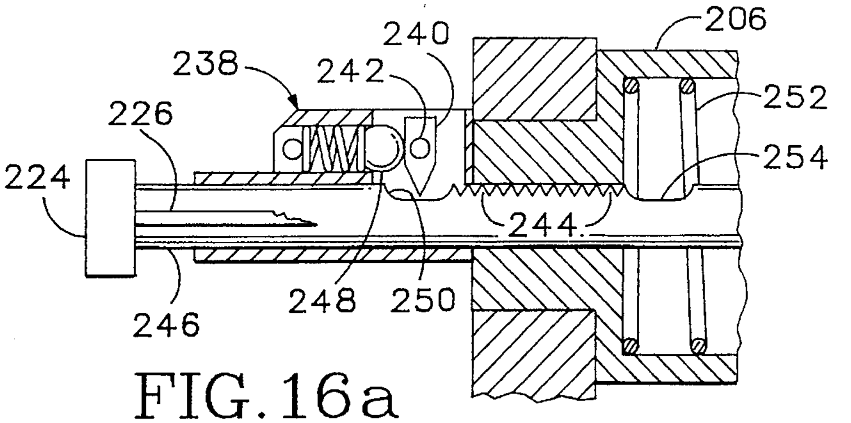
Figure 16B:
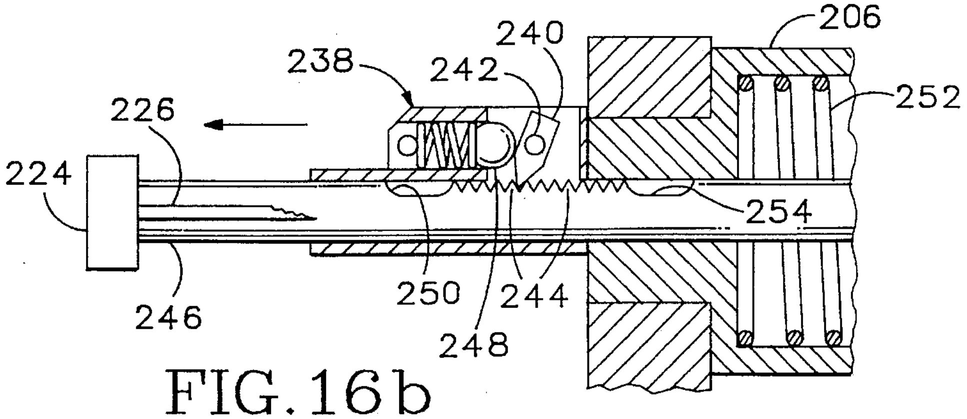
Figure 16C:
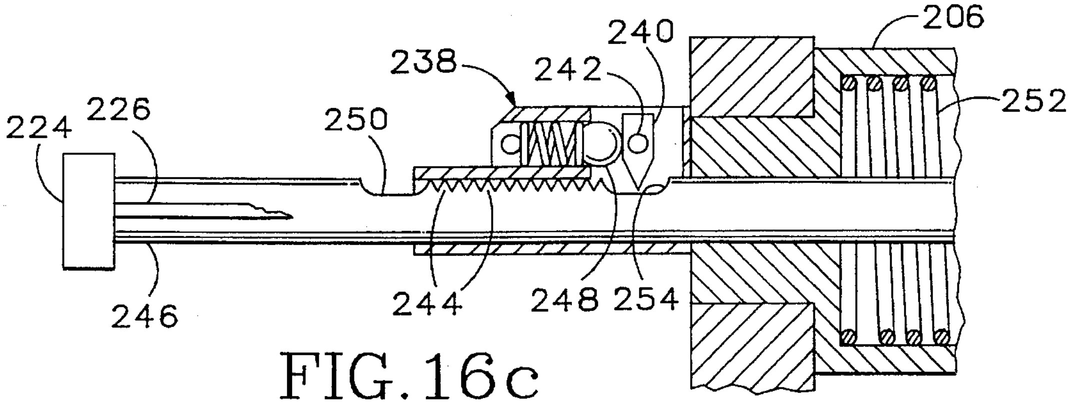
Figure 16D:
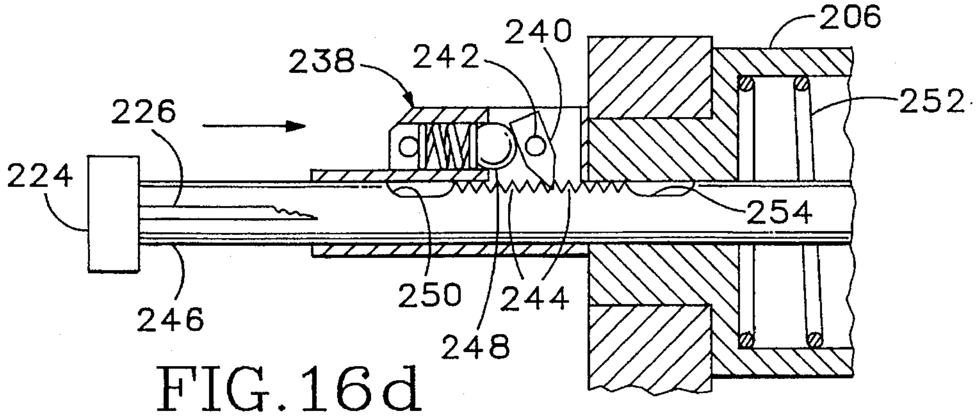

Referring to FIG. 16*a*–16*d* together, the second rachet mechanism 236 includes a pawl 240 which is pivotably mounted on a pin 242 for ratcheting engagement with a longitudinal series of teeth 244 that are formed along an intermediate section 246 of the actuating rod 224. The rachet mechanism 236 also includes a spring-biased ball 248 that urges the pawl toward a fully upright or centered position, provided that there is sufficient clearance beneath the pawl to allow the pawl to swing back over to this centered position about the fixed pivot pin 242. Referring specifically to FIG. 16*a*, before the actuating rod 224 has started to extend, the pawl is held in its centered position by the spring-biased ball so as to extend directly perpendicular to a forward drop-off slot 250 that is formed in the intermediate section 246.

Referring to FIG. 16*b*, when the actuating rod 224 begins to extend in the direction indicated, the teeth 244 on the extending rod shift the pawl to an off-centered position that is no longer perpendicular to the longitudinal axis of the rod, as shown. In this partially extended position, the teeth do not provide sufficient clearance beneath the pawl to allow the pawl to swing back to its centered position. This remains so, for example, even when the pneumatic cylinder 206 loses pressure and the actuating rod 224 is thus urged in a direction opposite to that indicated in FIG. 16*b* by the return spring 252. Referring to FIG. 16*c*, continuing the example just given, if the pressure to the pneumatic cylinder 206 is then restored, the rod 224 is able to travel from its partially extended position shown in FIG. 16*b* to its fully extended position shown in FIG. 16*c*. When the rod reaches its fully extended position, the spring-biased ball 248 returns the pawl to its centered position in accordance with the clearance provided beneath the pawl by a rearward drop-off slot 254 formed in the intermediate section 246. Referring to FIG. 14*d*, the rod is then free to retract in the direction indicated as the teeth 244 on the rod engage the pawl and shift the pawl off to the other side of its centered position. Ultimately, when the rod is fully retracted, as shown in FIG. 16*a*, the pawl moves again into the forward drop off slot 250, whereupon the rod stroke can be repeated.

Referring to FIG. 8, as previously described, the system of the present invention prevents miscrimps from occurring because of its exemplary jaw closure sequence, which ensures that the portion of the contact to be crimped 196 will actually be crimped instead of some other portion, and also because of the exemplary head-restraining mechanism 200, which prevents the type of miscrimp that occurs when the head portion 102 bends relative to the crimped portion so as to produce a "crooked" contact. In addition to preventing these two different types of miscrimps, the exemplary system, in accordance with its preferred method of use, is designed to prevent at least two other different types of miscrimps.

Referring also to FIG. 13*a*, the third type of miscrimp which the exemplary system is designed to prevent can occur when the conductive end 198 of the wire is formed by a number of individual strands, such as 256*a*, *b* and *c*. In particular, if one or more of these strands encounter the sides of the wire-positioning channel at too sharp an angle, these strands can bend back upon themselves. Referring also to FIG. 11, if a contact, such as 58*b*, is then attached to the wire 104, these bent or reflected strands can stick rearwardly out from behind the contact, thereby forming conductive pigtails 258, as indicated in dashed lines in FIG. 11.

The fourth type of miscrimp which the exemplary system is designed to prevent can occur when the individual strands 256 of the wire, after passing through the wire-positioning channel 48, snag on the extreme end of the base portion 100 of the contact and so prevent full insertion of the wire into the contact. If this occurs, the contact may simply fail to attach to the conductive end after being crimped or, alternatively, may attach to the end, but at a portion forwardly of the wire's insulative jacket, so that a portion of the conductive surfaces of the end are left exposed.

In accordance with the present invention, the third and fourth types of miscrimps just described are prevented in accordance with a preferred construction of the wire-positioning mechanism 46 and in accordance with a preferred method of its use. Referring to FIGS. 3 and 15, with respect to the overall construction of the wire-positioning mechanism 46, as already described, this mechanism includes a base member 180, which is attached to the underside of the crimping tool 144, and a pair of upper side members 178*a* and 178*b* movable with respect to the base member. More specifically, the left-hand and right-hand side members 178*a* and 178*b* each move pivotably about a corresponding pivot pin 262*a* and 262*b* fixed to the base member 180. Carried on the front portion of each left- and right-hand side member 178*a* and 178*b* is a corresponding left- and right-hand funnel side piece 264*a* and 264*b*, respectively. Referring to FIG. 13*a* these funnel side pieces 264*a* and 264*b* together comprise the wire-positioning guide 140, and their respective inner surfaces together define the wire-positioning channel 48.

Referring to FIGS. 12 and 13*a* together, each funnel side piece 264*a* and 264*b* is detachably fitted to the corresponding side member 178*a* and 178*b* by matably inserting a semi-annular shoulder 266*a* or 266*b* on each funnel side piece into a conformably dimensioned semi-annular groove 268*a* or 268*b* formed on the corresponding side member. Referring also to FIG. 3, a U-shaped bracket 270, which is attached to the base member 180 by a pair of hex-slotted screws, prevents over-pivoting of each side member 178a and 178b, but these screws and the bracket can be easily removed and each side member 178a and 178b can be slidably removed from its corresponding pivot pin 262a and 262b in order to facilitate replacement of the funnel side pieces by the fitting method just described. As will become clearer from the description provided hereinbelow, this ready replaceability of the funnel side pieces 264a and 264b allows the operator to freely interchange one set of funnel side pieces with another, so that a varied assortment of differently sized funnel side pieces can be kept on hand in order to flexibly adapt the wire-positioning guide to the sizes and types of wires and contacts being terminated.

Referring to FIGS. 9 and 12 together, in operation, the left- and right-hand funnel side pieces 264a and 264b are held biasably together by a spring 274 that urgably connects their corresponding side members 178a and 178b. The spring operates within a pair of transverse cavities 276a and 276b that are formed, respectively, on the underside of the side members 178a and 178b, and a pin 278a or 278b that downwardly depends into each cavity connects each end of the spring to the corresponding side member.

Held together in the manner just described, the funnel side pieces 264a and 264b preferably form a continuous generally funnel-shaped channel 48 having progressively narrowing, inwardly curving sides, as shown in FIGS. 9 and 13a. In particular, preferably the channel is of reverse hyperbolic shape. In addition, preferably the forward end 280 of the channel is of larger diameter than the conductive end 198 of the wire 104 to be inserted into the channel, while the inner rearward end 282 of the channel is preferably of smaller diameter than this conductive end, at least while the strands of the conductive end still remain in an outwardly spread or loosely crowded condition. Moreover, referring to FIG. 14, it is preferable that the inner rearward end 282 have a diameter that is smaller than the inner diameter 286 of the contact (e.g., 58a or 58b) being crimped and that the outer rearward end 288 have a diameter that is larger than the outer diameter 290 of the contact being crimped (e.g., in order that the base portion 100 of the contact will fit within the prealignment cavity 139).

Referring to FIGS. 8 and 12, as in conventional systems, the wire-positioning channel 48 of the exemplary wire-positioning mechanism 46 enables the conductive end of the wire to be guided as it is inserted through the channel so that the end will be automatically positioned between the jaws 142 of the crimping mechanism for crimping attachment to the prepositioned contact upon closure of the jaws. However, in addition to this conventional objective, a further objective of the exemplary wire-positioning channel is to prevent miscrimps, particularly of the third and fourth types identified above. It will now be explained how conformance of the wire-positioning channel 48 to the dimensional relationships just specified enables the wire-positioning channel to achieve this further objective.

Referring to FIG. 13a, as the conductive end 198 of the wire is inserted through the exemplary wire-positioning guide 140, any outwardly bent strand, such as 256a, which encounters the sides of the channel 48 will be funneled rearwardly, as shown, toward the inner rearward end 282 of the channel, provided that the strand does not exceed a predetermined angle of incidence or approach relative to the sides of the channel at the place of encounter. This predetermined angle of approach, which is indicated by dashed lines 292a–c for three different places of encounter, corresponds to the line or axis extending normally to the surface of the channel at the place of encounter. As indicated in the figure, the predetermined angle of approach increases as the place of encounter becomes closer to the inner rearward end 282. In other words, the further down the channel 48 that a sharply bent strand, such as 256a, advances before it encounters the channel sides, the more sharply the strand must be bent in order to be bent back upon itself because of its encounter. It will be recognized that this increasing ability of the exemplary channel 48 to funnel bent strands rearwardly in the direction of insertion 294, as these strands advance, can serve to significantly reduce the-frequency of occurrence of doubled-over strands and hence serve to reduce the frequency of occurrence of conductive pigtails 258 of the type depicted in FIG. 11.

An important attribute of the exemplary channel 48 that contributes to the beneficial effect just described is its progressively narrowing, inwardly-curving sides or, more particularly, its reverse hyperbolic shape. It is because of this shape, for example, that the angle at which a strand begins to fold back (e.g., 292a, *b* or *c*) becomes increasingly perpendicular to the direction of insertion of the wire as the strand advances along the channel, and thus the likelihood of such fold back occurring becomes increasingly more remote as the strand advances. In conventional systems, on the other hand, which sometimes use a wire-positioning channel having outwardly curving (e.g., bowl-shaped) sides, the opposite effect occurs, that is, the angle at which a strand begins to fold back becomes increasingly parallel to the direction of insertion of the wire as the strand advances along the channel, so that the likelihood of fold back occurring becomes increasingly more probable as the strand advances.

Referring again to FIG. 13a, this figure shows the loosely crowded individual strands of the wire end, such as 256b and 256c, just at the instant that such strands first encounter the sides of the channel 140 (the badly bent strand, 256a, is here not considered to be among the loosely crowded strands). The maximum cross-sectional area or diameter 284a for these strands, as it is shown in FIG. 13a, is thus the same as the maximum cross-sectional area or diameter which these strands had when they first entered the channel 140. In accordance with the present invention, the relative dimensions of the wire 104 and the channel 140 are selected so that the maximum cross-sectional area or diameter of the wire's conductive end is smaller than the minimum cross-sectional area or diameter through the channel, which minimum diameter here occurs at the inner rearward end 282, as shown. In accordance with this selection process, and in accordance also with the progressively narrowing shape of the channel, the cross-sectional area or diameter of the conductive end is increasingly reduced the further along it is inserted through the channel, as can be seen by comparing the diameter 284a in FIG. 13a with the diameter 284b in FIG. 13b. As depicted, this causes the wires to be funneled from a loosely crowded condition to a more tightly crowded condition, thereby making it less likely that the conductive end will subsequently snag on the extreme end of the base portion 100 of the contact. This, in turn, reduces the possibility of a miscrimp occurring, as described above.

Referring to FIG. 14, as earlier noted, preferably the diameter of the inner rearward-end 282 of the channel 140 is smaller than the inner diameter 286 of the contact to be crimped. As indicated in the figure, this ensures that the individual strands (e.g., 256b and 256c) that are just arriving at the cylindrically-shaped base or barrel portion 100 of the contact are all desirably inserted into this cylindrically-shaped portion, thereby preventing even a single strand from snagging or outwardly bypassing the contact. Assuming, then, that the operator properly continues to insert the wire until the conductive end is fully positioned inside the contact, there will be no opportunity for miscrimps to occur of the type in which some exposed portion of the conductive end remains outside the contact after crimping.

It may be noted that even when the contact is of particularly small-bore type, such that it will barely receive the wire end even though the strands in this end are in closely crowded condition, it is still likely, under the exemplary wire-guiding system described, that no end snagging will occur. This is so because as the individual strands (e.g., **256*b* and 256*c*) arrive at the inner rearward end 282 of the channel 48, the funnel side pieces 264*a* and 264*b* biasably expand a slight amount (against the return force provided by the spring 274 shown in FIG. 12) so as to exert a compressive pressure on the conductive end, as indicated by the arrows 296**. The individual strands are thus transversely compacted so that their cross-sectional area or diameter is even less than when the strands were in a closely crowded but uncompacted condition.

Referring now to FIG. 9, after guiding the conductive end 104 of the wire through the wire-positioning channel 48 and properly positioning this end relative to the portion of the contact to be crimped 196, the operator thereafter actuates the crimping jaws (such as by a foot-pedal control). The crimping jaws will then fully close and crimp the contact, as shown, in a manner that deformably attaches the contact to the conductive end.

Referring to FIGS. 9 and 14 together, it will be recognized that since, in accordance with the exemplary wire-guiding procedure above-described, the inner diameter 286 of the crimped contact is larger than the diameter of the inner rearward end 282 of the channel 48, it is necessary that the channel sides be movably expanded or opened in order to permit removal of the wire and the attached contact back through the channel. Referring to FIG. 12, in order to open the wire-positioning channel 48, the wire-positioning mechanism 46 includes a pneumatically actuated cylinder 298. When pressurized air is supplied to the cylinder via a pressured line 300 (FIG. 3), the rod 302 of the cylinder immediately extends so that a wedge member 304 included at the end of the rod drives apart the left- and right-hand upper side members **178*a* and 178*b*. In response, these side members pivot, each about its own pivot pin 262*a* or 262*b*, until their movement is stopped by the U-shaped bracket 270. This, in turn, causes the left- and right-hand funnel side pieces 264*a* and 264*b* to spread apart so that the channel 48 is shifted from a closed (or nearly closed) position, as shown in FIG. 13*b*, to an open or expanded position, as shown in FIG. 13*c*. After the channel is open, the operator can withdraw the wire 104 with the crimped contact (e.g., 58*a*) attached to it back through the open, and hence wider, channel. This channel-expanding operation is initiated automatically under the control of the electronic processing unit 193 (FIG. 2) just after full closure of the crimping jaws 192 (FIG. 9) has been completed. From the foregoing, it will be recognized how the split-piece or expandable design of the wire-positioning guide 140** is fundamental in permitting the exemplary wire-guiding procedure to be fully carried out.

Referring to FIGS. 3 and 8, after the operator has withdrawn the wire 104, with the crimped contact **58*a* attached to it, the proximity monitor or photosensor attached adjacent the crimping tool 144 detects the absence of any contact in the adjacent channel and changes its output signal, on output line 194, from an "IN POSITION" signal to a "CLEAR POSITION" signal. Referring also to FIGS. 2 and 12, after the funnel side pieces 264*a* and 264*b* have been afforded a brief period of time to return to their closed position, the electronic processing unit 193 actuates the removing unit 116*a* or 116*b* which has been earlier selected and further turns on the supply of pressurized air so that the next contact to be crimped is propelled through the transporting system 114 into an aligned position with the crimping jaws 142**, as previously described. The operator can then continue to perform successive crimping operations by simply repeating the sequence of steps heretofore described.

After performing a large number of crimping operations, one right after the other, provided that the operator is sufficiently skilled to use contacts at a faster rate than the sorter can reload them, the operator will eventually need to switch operations to a new pin-feeding chute. Referring to FIG. 5, a viewing window or slot 306 is provided in each chute **68*a* or 68*b* so that the operator can tell when the supply of contacts in a particular chute is nearing depletion levels. In order to switch to a new pin-feeding chute, the operator simply sets the rocker switch 120** to a new position, as described above.

Referring to FIGS. 3 and 12 together, a transparent protective guard 308 can optionally be provided, as indicated in dashed lines in FIG. 3, in mounted position over the wire-positioning channel 48. With this guard in place, should the channel become jammed open just as a contact is being propelled toward the channel, after passing through the channel, the contact will be harmlessly deflected by the protective guard.

Referring to FIGS. 3 and 8, if, during the full crimping operation, the portion of the contact to be crimped 196 completely fails to attach to the conductive end 198 because, for example, the operator insufficiently inserts the conductive end relative to the portion to be crimped 196, then, after the crimping jaws 142 open, the miscrimped contact is automatically withdrawn so as to enable the next contact to be positioned between the crimping jaws. This withdrawal operation occurs because gravitational force causes the miscrimped contact to fall through the lower channel 310 of the junction member 134. As indicated in FIG. 3, the miscrimped contact can develop sufficient speed as it falls to carry it to an intermediate position 314 within a generally horizontal discard tube 312. This position 314 is only temporary, however, because the pressurized air stream that pneumatically propels the next contact between the crimping jaws will also serve to push the discarded contact from the position 314 to a more permanent position within a discard container 316.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for attaching an electrical contact to the conductive end of a wire comprising:

(a) providing a crimping mechanism having at least a pair of opposing jaws and being adjustable between an open position in which an electrical contact will pass between said jaws and a closed position in which said electrical contact is crimped while positioned between said jaws;

(b) positioning an electrical contact between said jaws;

(c) partially closing said crimping mechanism so that said jaws firmly grip said contact without crimping it;

(d) thereafter, positioning the conductive end of a wire along said contact; and (e) thereafter, fully closing said crimping mechanism in order to crimp said contact for attachment to said conductive end.

2. The method of claim 1 wherein step (b) includes moving said contact between said jaws by propelling said contact toward said jaws and catching said contact when said contact reaches a predetermined position relative to said jaws.

3. The method of claim 1 including closing said crimping mechanism by pulling a lever portion of said crimping mechanism via a flexible interconnect line connected to a drive unit and preventing said interconnect line from slackening at any time prior to full closure of said crimping mechanism.

4. The method of claim 3 including pulling said lever portion by moving an actuator member on said drive unit in accordance with a predetermined movement and preventing said interconnect line from slackening by preventing said predetermined movement from reversing prior to full closure of said crimping mechanism.

5. The method of claim 3 including pneumatically operating said drive unit.

6. The method of claim 1 wherein step (b) includes loosely holding said contact so that said contact is free to shift back-and-forth relative to said jaws such that different longitudinally spaced portions of said contact move between said jaws, step (c) includes partially closing said jaws so that said jaws firmly grip a predetermined one of said longitudinally spaced portions, and step (e) includes fully closing said crimping mechanism in order to crimp said predetermined one of said longitudinally spaced portions.

7. The method of claim 6 wherein said crimping mechanism is partially closed automatically when said predetermined one of said longitudinally spaced portions is between said jaws.

8. The method of claim 6 wherein said longitudinally spaced portions include a base portion along which the conductive end of said wire first passes during insertion, and a head portion opposite said base portion and including physically restraining said head portion of said contact while said crimping mechanism is being fully closed so that said head portion is maintained in predetermined alignment with said predetermined one of said longitudinally spaced portions throughout full closure of said crimping mechanism.

9. The method of claim 8 wherein said predetermined one of said longitudinally spaced portions and said head portion are cylindrical in shape and including maintaining said head portion in concentric alignment with said predetermined one of said longitudinally spaced portions.

10. The method of claim 6 including automatically withdrawing said contact from between said jaws so as to enable a further contact to be positioned between said jaws when said predetermined one of said longitudinally spaced portions fails to deformably attach to said conductive end in step (e) because of incorrect positioning of said conductive end along said predetermined one of said longitudinally spaced portions in step (d).

* * * * *

UNITED STATES PATENT AND TRADEMARK OFFICE

CERTIFICATE OF CORRECTION

PATENT NO. : 5,592,738

DATED : January 14, 1997

INVENTOR(S) : Reiersgaard et al.

It is certified that error appears in the above-identified patent and that said Letters Patent is hereby corrected as shown below:

Col. 2, Line 6: Delete [,] between "its" and "prealigned"

Col. 3, Line 33: Delete [and] after "forward" insert --end--

Col. 5, Line 48: Delete [fin] after "preformed" insert --in--

Col. 6, Line 13: Delete [Of] and insert --of--

Col. 9, Line 14: Delete [Can] and insert --can--

Col. 9, Line 17: Delete [Over] and insert --over--

Col. 15, Line 56: Delete [griping] and insert --gripping--

Signed and Sealed this

Second Day of February, 1999

Attest:

*Attesting Officer*

*Acting Commissioner of Patents and Trademarks*